US008370115B2

(12) United States Patent
Rossignac

(10) Patent No.: US 8,370,115 B2
(45) Date of Patent: Feb. 5, 2013

(54) SYSTEMS AND METHODS OF IMPROVED BOOLEAN FORMS

(75) Inventor: Jaroslaw R. Rossignac, Atlanta, GA (US)

(73) Assignee: Broadcom Corporation, Irvine, CA (US)

(*) Notice: Subject to any disclaimer, the term of this patent is extended or adjusted under 35 U.S.C. 154(b) by 453 days.

(21) Appl. No.: 12/599,546

(22) PCT Filed: May 14, 2008

(86) PCT No.: PCT/US2008/063583
§ 371 (c)(1),
(2), (4) Date: Nov. 10, 2009

(87) PCT Pub. No.: WO2008/144330
PCT Pub. Date: Nov. 27, 2008

(65) Prior Publication Data
US 2011/0004449 A1 Jan. 6, 2011

Related U.S. Application Data

(60) Provisional application No. 60/917,964, filed on May 15, 2007.

(51) Int. Cl.
G06F 17/50 (2006.01)
(52) U.S. Cl. .................................. 703/1; 703/2
(58) Field of Classification Search .......... 703/1
See application file for complete search history.

(56) References Cited

U.S. PATENT DOCUMENTS

| 4,591,993 | A | | 5/1986 | Griffin et al. | |
|---|---|---|---|---|---|
| 4,700,325 | A | * | 10/1987 | Ware | 708/670 |
| 4,769,772 | A | * | 9/1988 | Dwyer | 707/714 |
| 5,047,672 | A | | 9/1991 | Bhuva et al. | |
| 5,724,494 | A | * | 3/1998 | Politis | 345/592 |
| 6,028,987 | A | | 2/2000 | Hirairi | |
| 6,415,430 | B1 | | 7/2002 | Ashar et al. | |
| 7,509,597 | B1 | * | 3/2009 | Manohararajah et al. | 716/116 |
| 7,724,158 | B2 | * | 5/2010 | Wu | 341/50 |

OTHER PUBLICATIONS

Oldfield et al, "Improving Data Access for Computational Grid Applications", Cluster Computing 9, pp. 79-99, 2006.*
Hable et al, "Blister: GPU-based Rendering of Boolean Combinations of Free-Form Triangulated Shapes", ACM Transactions on Graphics (SIGGRAPH) 24(3): 1024-1031, 2005.*
Payne, h., Meisel, w. 1977. An algorithm for constructing optimal binary decision trees. IEEE Trans. Comput. TC-26, 9:905-916.
Bollig, B.; Wegener, I. 1996. Improving the variable ordering of OBDDs is NP-complete. Computers, IEEE Transactions on vol. 45, Issue 9, Sept. pp. 993-1002.
Rossignac, J. 1996. CSG formulations for identifying and for trimming faces of CSG models. In CSG'96: Set-theoretic solid modeling techniques and applications, Information Geometers, Ed. John Woodwark. 1-14.
Requicha, A., Voelcker, H. 1985. Boolean operations in solid modeling: Boundary evaluation and merging algorithms. Proceedings of the IEEE, 75(1):30-44.

(Continued)

Primary Examiner — Mary C Jacob
(74) Attorney, Agent, or Firm — Thomas|Horstemeyer, LLP.

(57) ABSTRACT

Various systems, methods, and computing units are provided for reduced cost evaluation of Boolean expressions. In one representative embodiment, a method includes: determining a first modified cost measure for a node of a binary tree, the first modified cost measure comprising M cost values, the node in an original condition; pivoting the node; determining a second modified cost measure for the node in a pivoted condition, the second modified cost measure comprising M cost values; and determining a preferred node condition responsive to a comparison of the first and second cost measures.

21 Claims, 15 Drawing Sheets

OTHER PUBLICATIONS

Rossignac, J., Requicha, A. 1986. Depth-buffering display techniques for constructive solid geometry, IEEE Computer Graphics and Applications, 6(9):26-39.

Rossignac, J., Wu, J. 1992. Correct shading of regularized CSG solids using a depth-interval buffer, Advanced Computer Graphics Hardware V: Rendering, Ray Tracing and Visualization Systems, Eurographics Seminars, 117-138.

Goldfeather, J., Hultquist, J. P. M., Fuchs, H. 1986. Fast constructive solid geometry display in the pixel-powers graphics system. Annual Conference on Computer Graphics and Interactive Techniques, 107-116.

Cao, A. and Koh, C.K. 2003. Non-Crossing Ordered BDD for Physical Synthesis of Regular Circuit Structure. Purdue University. http://docs.lib.purdue.edu/ecetr/136. NSF Grant CCR-9984553.

Nedjah, N. and de Macedo Mourelle, L. Three Hardware Architectures for the Binary Modular Exponentiation: Sequential, Parallel, and Systolic. IEEE Transactions on Circuits & Systems Part I, Mar. 2006, 53(3):627-633.

Dudek, P. and Hicks, P., A General-Purpose Processor-per-Pixel Analog SIMD Vision Chip. IEEE Transactions on Circuits & Systems Part I, Jan. 2005, 52(1):13-20.

International Search Report and Written Opinion in co-pending PCT Application No. PCT/US08/063583 mailed Aug. 25, 2008.

Goldfeather, J., Molnar, S., Turk, G., Fuchs, H. 1989. Near realtime CSG rendering using tree normalization and geometric pruning. IEEE Computer Graphics and Applications, 9(3):20-28.

Rossignac, J. 1994. Processing Disjunctive forms directly from CSG graphs, Jarek Rossignac. Proceedings of CSG 94: Set-theoretic Solid Modelling Techniques and Applications, Information Geometers, pp. 55-70, Winchester, UK.

Rossignac, J. 1999. BLIST: A Boolean list formulation of CSG trees, Technical Report GIT-GVU-99-04. GVU Center, Georgia Tech. http://www.cc.gatech.edu/gvu/reports/1999/.

Hable, J. Rossignac, J. 2005. Blister: GPU-based rendering of Boolean combinations of free-form triangulated shapes, ACM Transactions on Graphics (SIGGRAPH). 24(3):1024-1031.

Hable, J. Rossignac, J. 2007. CST: Constructive Solid Trimming for rendering BReps and CSG. IEEE Transactions on Visualization and Computer Graphics, 13(5). GVU Tech Report GIT-GVU-07-08.

Requicha, A. 1980. Representations for Rigid Solids: Theory, Methods, and Systems. ACM Comput. Surv. 12(4):437-464.

Rossignac, J., Voelcker, H. 1988. Active zones in CSG for accelerating boundary evaluation, redundancy elimination, interference detection, and shading algorithms, ACM Transactions on Graphics, 8(1):51-87.

Ellis J., Kedem G., Lyerly G. T., Thielman D., Marisa R., Menon J. 1991. The Ray Casting Engine and ray representations. ACM Symposium on Solid Modeling Foundations and Applications, 255-268.

Bryant, R. 1986. Graph-based algorithms for Boolean function manipulation. IEEE Trans. Comput. 35(8):677-691.

Bryant, R. 1995. Binary decision diagrams and beyond: enabling technologies for formal verification. IEEE/ACM International Conference on Computer-Aided Design, 236-243.

Akers, S. 1978. Binary decision diagrams. IEEE Trans. Comput. C-27 (Jun.), 509-516.

Yang, B., O'Hallaron, D. 1997. Parallel breadth-first BDD construction. ACM SIGPLAN Symposium on Principles and Practice of Parallel Programming, 145-156.

Bryant, R. 1991. On the Complexity of VLSI Implementations and Graph Representations of Boolean Functions with Applications to Integer Multiplication. IEEE Transactions on Computers, 40(2)205-213.

* cited by examiner

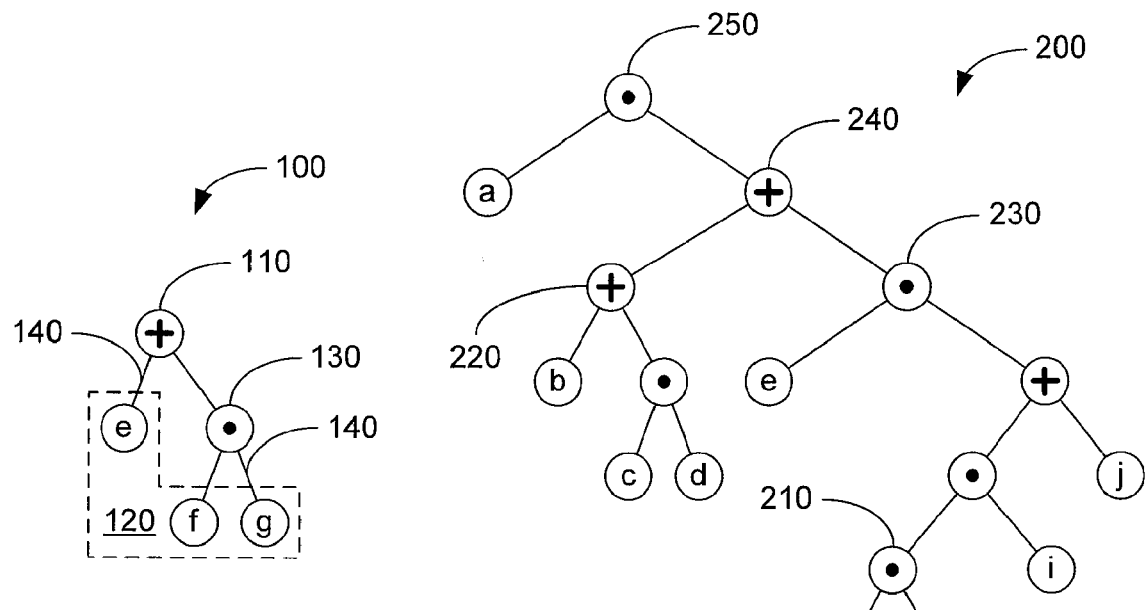
FIGURE 1
(Prior Art)
FIGURE 2A
(Prior Art)
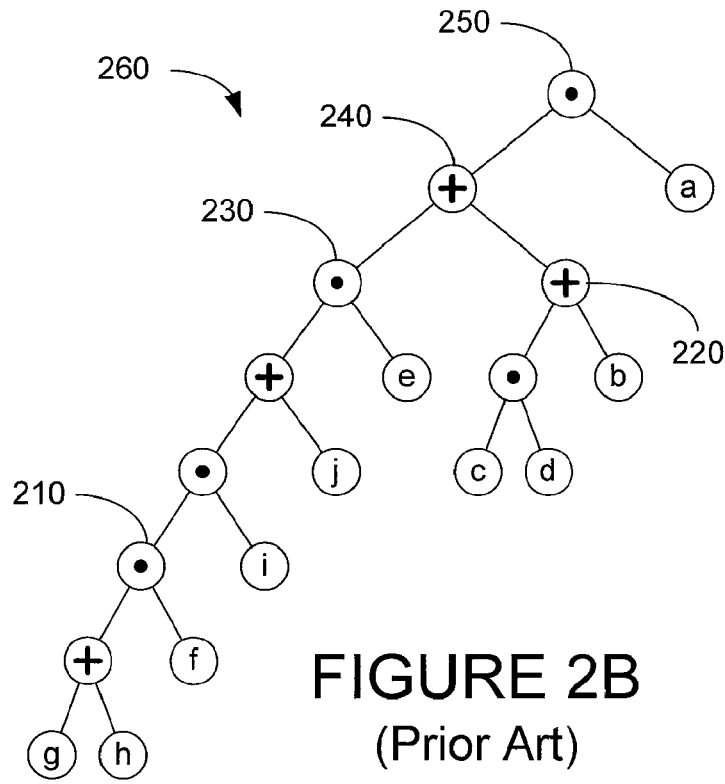
FIGURE 2B
(Prior Art)

SYSTEMS AND METHODS OF IMPROVED BOOLEAN FORMS

CROSS-REFERENCE TO RELATED APPLICATION

This application is related to copending U.S. Provisional Application Ser. No. 60/917,964, filed on May 15, 2007, which is entirely incorporated herein by reference. This application also claims priority to, and the benefit of, PCT Application No. PCT/US2008/063583 entitled, "Systems and Methods of Improved Boolean Forms," filed on May 14, 2008, which is entirely incorporated herein by reference.

BACKGROUND

Constructive solid geometry (CSG) representations combine primitive shapes through regularized Boolean expressions. The primitive shapes define regularized solids, which may be represented as parameterized primitives, such as cylinders, blocks, or more general boundary representations. The Boolean expressions combine the primitives though regularized operations, such as union, intersection, or difference.

The set-theoretic Boolean expression of a CSG model may be parsed into a binary tree T, where each leaf corresponds to a primitive (or literal). The tree T in fact represents a Boolean expression, obtained by replacing the set-theoretic operators by their Boolean equivalent and by associating a truth-value with each leaf. The CSG expression is converted into a positive form Boolean expression E of n literals.

Boolean expressions are written in terms of literals and operations. Each occurrence of a variable is a different literal. For clarity, a different symbol (a, b, c . . . A, B, C . . . ) is used for each literal. Arbitrary Boolean expressions may be converted to their positive-form as follows. First, express all operators in terms of union, which is denoted by '+', intersection, which is omitted or denoted by '·' and complement, which is denoted by a preceding '!' and endowed with highest priority. For example, the difference a\b is converted to a·(!b), or alternatively denoted as a!b, and the symmetric difference (logical XOR) a⊗b is converted to a!b+b!a. Then, convert the expression into its positive form by recursively applying de Morgan laws: !!a=a, !(a+b)=!a!b, and !(ab)=!a+!b. Finally, replace all complemented literals with new literals that denote their complement. The result is an expression with n literals and n−1 operators, which are either '·' or '+'. For example, the Boolean expression (a·b)+(c·(d+e)) has five literals and four operators. For simplicity, omitting '·' and assuming that it has higher priority than '+', the expression may be rewritten as ab+c(d+e). Remember that each occurrence of a variable is a different literal. Thus, for example, the expression a!b+b!a has four literals.

Parsing a positive-form expression E produces a binary tree T, whose 2n−1 nodes correspond each to a different literal or operator in E. For example, FIG. 1 is an illustration of a binary tree 100 representing the expression e+fg. The node 110, which corresponds to the final executed operator when evaluating E, is the "root". Nodes 120 corresponding to literals are called "leaves". Note that even though the same primitive may appear in several places in the CSG model, each instance has typically a different position and orientation and may yield a different classification of a surfel candidate. Hence, each primitive instance is treated as a different literal.

A non-leaf node is called an "op-node" (e.g. nodes 110 and 130). In a binary tree T, there are exactly n−1 op-nodes. In the binary tree 100 illustrated in FIG. 1, there are three leaves 120 and two op-nodes 110 and 130. If an op-node N corresponds to a Boolean combination (e.g. L+R or L·R) of two sub-expressions or literals, then L and R are respectively the "left and right children" of N and that N is their "parent". In FIG. 1, leaves 120f and 120g are the left and right children, respectively, of op-node 130 and leaf 120e and the sub-expression fg (represented by nodes 120f, 120g, and 130) are the left and right children, respectively, of op-node 110. Each parent is separated from each one of its children by one "link" 140. The "distance" between two nodes is the number of links in the shortest path joining them. The "depth" of a node is the maximum distance separating it from its leaves. Hence, in FIG. 1, the depth of a leaf 120 is zero and the depth of the root 110 is two. A tree is "alternating" when no op-node has a parent with the same operator and a tree is "full" when the left and right children of each op-node have the same depth.

SUMMARY

Embodiments of the present disclosure methods and systems related to improved forms of Boolean expressions.

Briefly described, one embodiment, among others, comprises a method. The method comprising: determining a first modified cost measure for a node of a binary tree, the first modified cost measure comprising M cost values, the node in an original condition; pivoting the node; determining a second modified cost measure for the node in a pivoted condition, the second modified cost measure comprising M cost values; and determining a preferred node condition responsive to a comparison of the first and second cost measures.

Another embodiment, among others, comprises a logic matrix. The logic matrix, comprising: N gates, each gate associated with one of N literals of a positive-form Boolean expression, each gate configured to connect an input to either a first output or a second output responsive to a truth-value of the associated literal; and M lines, where each input and output of the N gates is connected to one of the M lines to provide a logical solution to the positive-form Boolean expression within one clock cycle.

Another embodiment, among others, comprises a logic pipe. The logic pipe, comprising: a series of N gates connected by a pipe, each gate associated with one of N literals of a positive-form Boolean expression, a first gate of the series of N gates configured to: receive an identifier from the pipe; and if the received identifier does not match an identifier of the first gate, pass the received identifier to a next gate in the series of N gates.

Other systems, apparatus, methods, features, and advantages of the present disclosure will be or become apparent to one with skill in the art upon examination of the following drawings and detailed description. It is intended that all such additional systems, apparatus, methods, features, and advantages be included within this description, be within the scope of the present disclosure, and be protected by the accompanying claims.

BRIEF DESCRIPTION OF THE DRAWINGS

Many aspects of embodiments of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1 is an illustration of a binary tree representing the expression e+fg;

FIG. 2A is an illustration of a binary tree representing the positive-form expression a(b+cd+e(f(g+h)i+j));

FIG. 2B is an illustration of a binary tree after pivoting the binary tree of FIG. 2A into the left-heavy form;

DETAILED DESCRIPTION

Figure 3:
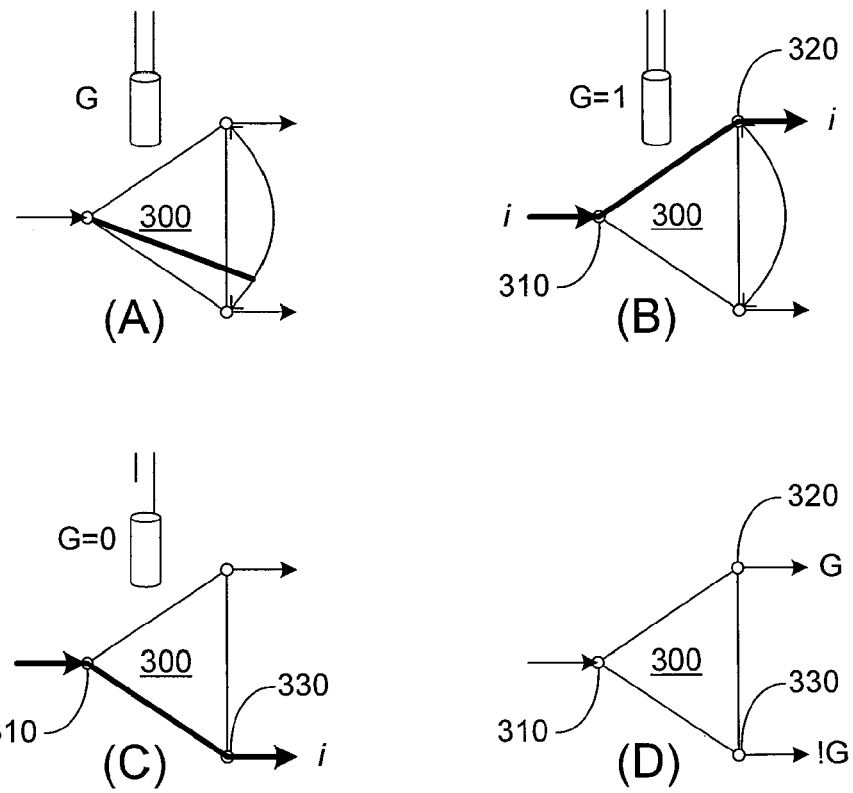
FIG. 3 is an illustration of the operation of a gate 300, which may be used to represent a literal in a blist circuit according to an embodiment of the present disclosure.

Disclosed herein are various embodiments of methods and systems related to reduced cost evaluation of Boolean expressions. Reference will now be made in detail to the description of the embodiments as illustrated in the drawings, wherein like reference numbers indicate like parts throughout the several views.

Digital models of complex solid parts, such as those found in mechanical assemblies, may often be specified by combining primitive solids (e.g., blocks, cylinders, spheres . . . ) through regularized set theoretic Boolean operations (union, intersection, difference). The result of such a design process is a Constructive Solid Geometry (CSG) model, which represents the desired solid as the topological closure of the interior of a set-theoretic Boolean expression that combines solid primitives (literals).

Consider a candidate point q that does not lie on the boundary of any primitive. The point-in-primitive classification of q with respect to a primitive P returns a Boolean (truth-value) which is true when q∈P and false otherwise. The classification result with respect to each CSG primitive defines the truth-value of the corresponding literal. To obtain the classification of q with respect to the CSG solid (i.e., to decide whether q is in the CSG solid or not), it suffices to evaluate E. If q lies on the boundary of another primitive Q of the CSG solid, the above approach is not sufficient because there is no truth-value for literal Q and because replacing it by true or by false will in general not yield the correct result. In such cases, q may be classified against the CSG expression of the active zone of Q in E, which represents the portion of space where the boundary of Q contributes to the boundary of the solid.

Although many applications require computing a boundary representation (BRep) of the CSG model, the boundary evaluation process is expensive and delicate, both numerically and algorithmically. Shaded images of a CSG model may be produced in realtime directly from the CSG representation, avoiding the problems of the BRep computation. Such direct CSG algorithms exploit the speed of contemporary graphics adapters, which operate on pixels in parallel. Most approaches generate a set of candidate surfels (surface samples and associated color values densely distributed on the boundaries of the primitives) and classify them so as to identify which are on the boundary of CSG model. Successive layers, obtained by a front-to-back peeling order, are trimmed by classifying their surfels against the CSG model. The retained surfels are incorporated in the final image using a depth-test. A z-buffer test may be used to discard the occluded ones. Because a primitive may be self-occluding, the candidate surfels on a primitive Q are produced in layers (in front-to-back "peeling" order using a depth-interval buffer or in rasterization order using a stencil counter) by having the graphics hardware rasterize a triangulation of Q.

To classify all the candidate surfels of a layer of Q in parallel against a primitive P, P is rasterized and, for each candidate surfel, the parity of the number of times the candidate surfel is occluded by a triangle of P is tracked. Odd parity indicates that the surfel is in P. Even parity indicates that surfel is out. (The delicate on/on cases where a candidate surfel of Q happens to also lie on P are handled by offsetting the candidate surfels by a small distance away from the viewer or by assigning an artificial depth order to primitives.) One stencil bit per pixel is used to keep track of the parity (i.e., classification) information. Another stencil bit per pixel is used to distinguish pixels that have a locked candidate surfel. Unfortunately, there are typically only 8 such stencil bits per pixel and copying their values to texture memory is slow. Therefore, unless the CSG expression is trivial, one cannot afford to store all of the surfel/primitive classification truth-values for each pixel at which a candidate surfel is present. Thus, the truth-values may be combined into a final result using only these 6 stencil bits as working memory (footprint) for each pixel. To minimize the footprint, the surfel/primitive classification results may be combined according to the Boolean expression of the CSG model or of the active zone of Q.

Surfel classification can be preformed using a blist (Boolean list) form of the expression E. Blist associates with each primitive P of expression E three integer labels: P.i (the ID representing the identifier of P), P.t (the ID representing the next relevant primitive that may affect this surfel if the truth-value V is true), and P.f (the ID representing the next relevant that may affect this surfel if V is false). At any given moment, the stencil of each pixel may hold:

A mask bit M indicating whether the pixel contains a candidate surfel or is locked;

A classification (parity) bit V indicating whether the candidate surfel is inside the primitive P; and A label "next" stored in the remaining 6 bits indicating the name of the next relevant primitive.

For each literal P in expression E, the following is performed:
1. Rasterize all the triangles of P. During the rasterization, each time a triangle of P covers a pixel where M==true and occludes the surfel stored at that pixel (depth test), we toggle the V bit of the pixel.
2. Broadcast (P.i, P.t) and, at each pixel, do:
   if (M && (P.i==next) && V) next=P.t.
3. Broadcast (P.i, P.f) and at each pixel do:
   if (M && (P.i==next) && V) next=P.f.

In the end, the surfel candidates of pixels where next==0 are in the CSG model. For example, if we were classifying surfels on Q against the active zone of Q, then surfels that pass this classification are on the solid. So, the blist evaluation may be viewed as an example of clocked sequential logic in a SIMD architecture as in "A General-Purpose Processor-per-Pixel Analog SIMD Vision Chip" by Dudek, P. and Hicks, P. (*IEEE Transactions on Circuits & Systems Part* 1, January 2005, 52(1):13-20). However, with only 6 stencil bits for storing the ID, next, at each pixel, and can hence only accommodate $2^6$=64 different IDs.

The cost of the evaluation of an expression may be determined in terms of the number s(n) of steps (or operations) and the number b(n) of working memory bits (or the "footprint") that are needed to evaluate a positive-form expression E. Assume that the truth-value of each literal can be read one at a time. The number s(n) of steps (operations) and the number b(n) of working memory bits (footprint) that are needed to evaluate E may be minimized. Both s(n) and b(n) depend on the number of literals n, but also on the expression E and on the particular evaluation technique used.

A naïve evaluation of E from left-to-right that respects parentheses and operator priorities will perform s(n)=n−1 steps, one per operator, but may require a footprint of n bits. It corresponds to a bottom-up traversal of the binary tree. For example, in the expression a+b(c+d(e+f(g . . . ))), if a=false, b=true, c=false, d=true . . . the left-to-right evaluation will cache the truth-values of all the literals before starting to combine them.

Because both the intersection '·' and union '+' operators are commutative, one can often reduce the footprint by pivoting such expressions (swapping left and right arguments of selected operators or, equivalently, the left and right children of tree nodes) to make the tree left-heavy. A binary tree T may be transformed into another tree representing an equivalent expression by a sequence of "pivots", where the left and right children of an op-node swap positions. For example, FIG. 2A is an illustration of a binary tree 200 representing the positive-form expression a(b+cd+e(f(g+h)i+j)). A left-heavy form of binary tree 200, in which the depth of the left child of each op-node equals or exceeds the depth of the right child, may be constructed by a recursive procedure that pivots each op-node N if the depth of the right child exceeds the depth of the left child and then returns the depth of the pivoted op-node N. For example, in FIG. 2A, depth the right child (expression g+h with depth=1) of node 210 exceeds the depth of the left child (literal f with depth 0). Thus, the expression f(g+h) of node 210 is pivoted to provide the left-heavy version of the expression (g+h)f as illustrated in FIG. 2B. The procedure is repeated producing pivots of nodes 220 through 250. FIG. 2B is an illustration of a binary tree 260 after pivoting the binary tree 200 of FIG. 2A into the left-heavy form (((g+h)fi+j)e+(cd+b))a. It can be shown that the footprint b(n) for some expressions, even with pivoting, may exceed $\lceil \log_2 n \rceil + 1$ bits.

To reduce the footprint, one may consider evaluating the disjunctive form of E, which is described in "Near realtime CSG rendering using tree normalization and geometric pruning" by Goldfeather, J., Molnar, S., Turk, G., and Fuchs, H. (*IEEE Computer Graphics and Applications*, 9(3):20-28, 1989), the entirety of which is hereby incorporated by reference. The disjunctive form may be pre-computed by distributing all '·' operators over '+' operators. For example, the disjunctive form of a(b+c)(d+e) is the sum (union) of four products (intersections): abd+abe+acd+ace. Note that one does not need to store the entire disjunctive form explicitly; rather its products may be easily processed, one at a time, directly from the binary tree T. Processing of disjunctive forms is described in "Processing Disjunctive forms directly from CSG graphs" by Rossignac, J. (*Proceedings of CSG 94: Set-theoretic Solid Modelling Techniques and Applications, Information Geometers*, pp. 55-70, 1994), the entirety of which is hereby incorporated by reference. Evaluating the disjunctive form of E reduces the footprint b(n) to 2 bits: one bit records whether any of the already processed literals in the current product is false and the other bit records whether any of the previously processed products evaluates to true. However, such an approach may require an exponential number of steps (operations), since the disjunctive form may have $2^{n/2}$ products of n/2 literals each. For example, evaluating the expression (a+b)(c+d)(e+f)(g+h)(i+j)(k+l)(m+n)(o+p) with 16 literals, yields a disjunctive form of $2^8$ products of 8 literals each: acegikmo+acegikmp+acegikno+acegiknp+acegilmo . . .

An alternative to these two extremes (the naïve evaluation possibly requiring a $\log_2 n$ footprint and the disjunctive form possibly requiring an exponential number of steps), based on an improved blist form, requires only s(n)=n steps and b(n) =$\lceil \log_2 j \rceil$ bits, where j=$\lceil \log_2(2n/3+2) \rceil$. The reduced cost form is an improvement on a non-reduced blist (Boolean list) form discussed in "BLIST: A Boolean list formulation of CSG trees" by Rossignac, J. (*Technical Report GIT-GVU-99-04. GVU Center, Georgia Tech, 1999*), the entirety of which is hereby incorporated by reference. If the improved Boolean form is used, b stencil bits suffice to support all CSG trees with $3 \times 2^{c-1} - 1$ primitives, where c=$2^b$. For example, 2 stencil bits suffice to correctly process all CSG expression with up to 21 primitives, 3 stencil bits suffice for expressions with up to 381 primitives, 4 stencil bitts suffice for up to 98301 primitives, 5 stencil bitts suffice for up to $6.4 \times 10^9$ primitives, and 6 stencil bits suffice for all expressions with up to $2.7 \times 10^{19}$ primitives.

Boolean expressions in blist form may be represented as a blist circuit using a gate (or switch) to represent each literal (or leaf-node). The blist circuit may then be implemented to create programmable hardware that would establish, in one clock cycle, whether a particular Boolean expression E evaluates to true or false, given the truth-values of its literals. FIG. 3 is an illustration of the operation of a gate 300, which may be used to represent a literal in a blist circuit. In the exemplary embodiment of FIG. 3, the gate 300 is designated G. The gate 300 transitions between positions in response to state of the associated literal as shown in FIG. 3(A). When G is in a true state, the gate 300 is in an up position as shown in FIG. 3(B).

If current (I) arrives to the input node 310 at the left of the gate 300 when in a true state, current will flow to the upper right exit (or output) node 320 of FIG. 3(B). When G is false, the switch 300 is in a down position and, if current arrives at the input node 310, it flows to the lower output node 330 of FIG. 3(C). Hence, the top output represents G and the bottom output represents !G as in FIG. 3(D).

Figure 4:
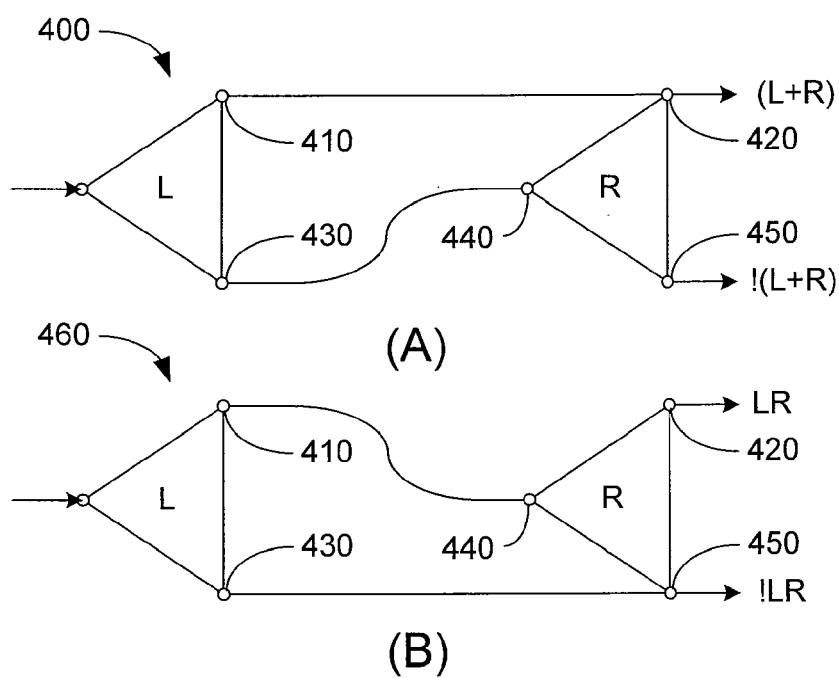
FIG. 4 is an illustration of how two gates of FIG. 3 may be connected to form a blist circuit representing either a union or intersection expression according to an embodiment of the present disclosure.

Two gates 300 may be used to model a union or an intersection of two literals and/or sub-expressions. FIG. 4 is an illustration of how two gates 300 of FIG. 3 may be connected to form a blist circuit representing either a union or intersection expression. In the embodiment of FIG. 4(A), two gates, associated with literals L and R, are connected to form a circuit 400 representing a union expression. When L is true, arriving current exits from the top output node 410 of L and reaches directly the top right output node 420 of the combined circuit, regardless of the value of R. If however L is false, arriving current flows from the bottom output node 430 of L to the input 440 of R. In that case, if R is true, then current flows to the upper output node 450 of R. In the embodiment of FIG. 4(B), the two gates are connected to form a circuit 460 representing an intersection expression. In FIG. 4(B), arriving current will flow out of top right output node 420 only when both L and R are true. Similarly, blist circuits may be connected to model expressions L+R or LR for Boolean sub-expressions, L and R.

Figure 5:
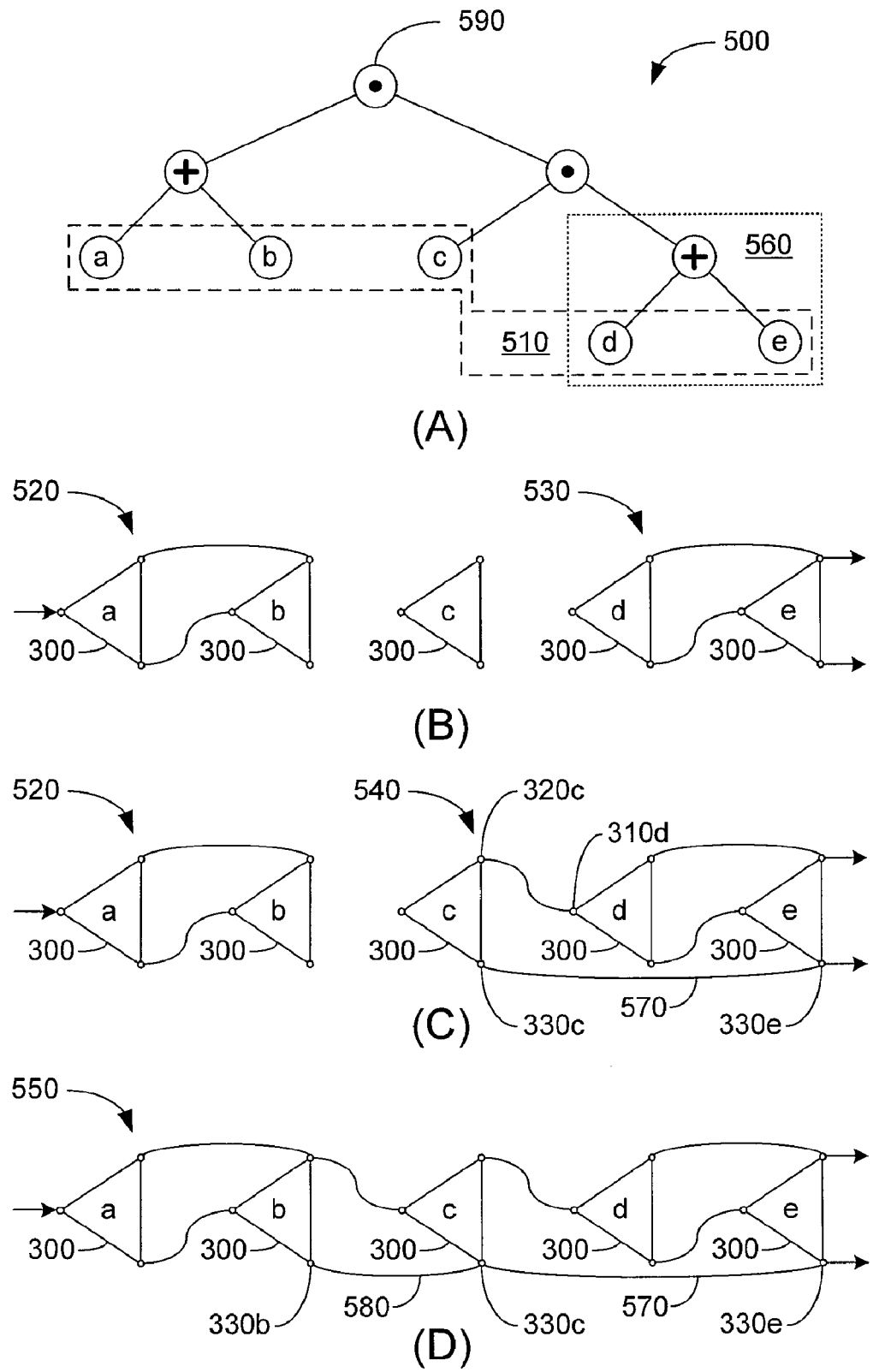
FIG. 5 is a graphical representation of the development of a blist circuit for the expression (A+B)(C(D+E)) using the gates of FIG. 3 and the connections of FIG. 4 according to an embodiment of the present disclosure.

This process may be applied recursively to construct a blist circuit of any positive-form Boolean expression. FIG. 5 is a graphical representation of the development of a blist circuit 550 for the expression (a+b)(c(d+e)) using the gates of FIG. 3 and the connections of FIG. 4. The expression (a+b)(c(d+e)) may be represented by the binary tree 500 illustrated in FIG. 5(A) with five literals 510 (a–e) and four op-nodes. Each literal has a corresponding gate (or switch) 300 (a–e) in the circuits of FIGS. 5(B-D). First, op-nodes having two literals 510 as children are connected as illustrated in FIG. 4. This is illustrated in FIG. 5(B), where the circuits 520 and 530 modeling sub-expressions a+b and d+e, respectively, are connected. Next, op-nodes having one literal and one sub-expression as children are connected. For the exemplary embodiment of FIG. 5, the circuit 540 modeling the sub-expression c(d+e) is connected to model the intersection '·' between the literal 510c and the sub-expression d+e 560. As illustrated in FIG. 5(C), the true output 320c of gate 300c is connected to the input 310d of the circuit 530 modeling sub-expression d+e and the false output 330c of gate 300c is connected 570 to the false output 330e of the circuit 530 modeling sub-expression d+e. Finally, op-nodes having two sub-expressions as children are connected in FIG. 5(D). Note that in FIG. 5(D), the false output 330b of gate 300b is not directly connected to the false output 330e of the circuit 540 modeling sub-expression c(d+e), but rather utilizes the existing connection 570 between the false output 330c of gate 300c and the false output 330e of the circuit 530 modeling sub-expression d+e. Other processes may connect gates based upon the increasing depth of the children, beginning with a depth of zero.

Referring back to FIG. 3, the modeling process associates with each gate 300 (e.g., gate G) two names (or labels): G.T and G.F. G.T is the name of the gate whose input is reached by the line connected to the top-output 320 of G (i.e., incoming current flows to the input associated with G.T when the truth-value associated with gate G is true). G.F is the name of the gate whose input is reached by the line connected to the bottom-output 330 of gate G (this is where incoming current flows to the input associated with G.F when the truth-value associated with G is false). For example, in the circuit 550 of FIG. 5(D) gate 300a associates a.T=c and a.F=b. Thus, current supplied to the input of gate 300a flows to the input of gate 300c when the truth-value is true and to the input of gate 300b when the truth-value is false. The top of the last gate 300e connects to TRUE and the bottom of the last gate to FALSE. To reduce the number of lines (which is important for improving the modeling), the connection 580 links b.F to c.F (as opposed to e.F). There is no need to extend the connection 580 to e.F, since c.F is already connected to e.F by connection 570.

In one embodiment, evaluation of a Boolean expression using a blist form may use an amount of working memory needed to store a label (e.g. in one embodiment called "next") indicating the next gate to be evaluated. It can be initialized to the label of the first literal and then updated to contain the label of the next literal whose truth-value will affect the final value of the expression or the label associated with the final results (true or false). For example, let P.V be the truth-value of literal P. For each literal P, the blist evaluation performs the following:

if (P==next) {if (P.V) next=P.T; else next=P.F;}

A blist wiring process may be implemented to compute and encode the result of the wiring process described above. Each node of a binary tree T and each gate (associated with a leaf-node) is represented as a different node-object or gate-object, respectively. A table of node-objects (e.g. "Nodes[ ]") is used, where Nodes[0] represents the root-node. Each node-object may be associated with the following fields (internal variables): "O" is the node-type ('+' for union, '·' for intersection, and ' ' for a literal), "L" and "R" identify the left and right children for op-nodes, "G" identifies the gate-object associated with a leaf-node; "T" and "F" identify the gates to reach if the truth-value of the node is true and false, respectively; and "t" and "f" store the costs associated with the node. A method of the node class has access to the fields associated with the node-object. A table of gate-objects (e.g. "Gates[ ]") is also used. Each gate-object may be associated with the following fields (internal variables): "N" identifies the literal (name) associated with the gate; "T" and "F" identify the gates to reach if the truth-value of the node is true and false respectively; "i", "t" and "f" are integers identifying the three labels G.i, G.t, and G.f associated with a gate G, respectively. A method of the gate class has access to the fields associated with the gate-object. Two additional gate-objects, "Tgate" and "Fgate", may be used to indicate that the expression evaluates to either true or false, respectively. They may be initialized as Tgate.N='t' and Fgate.N='f'.

Figure 6:
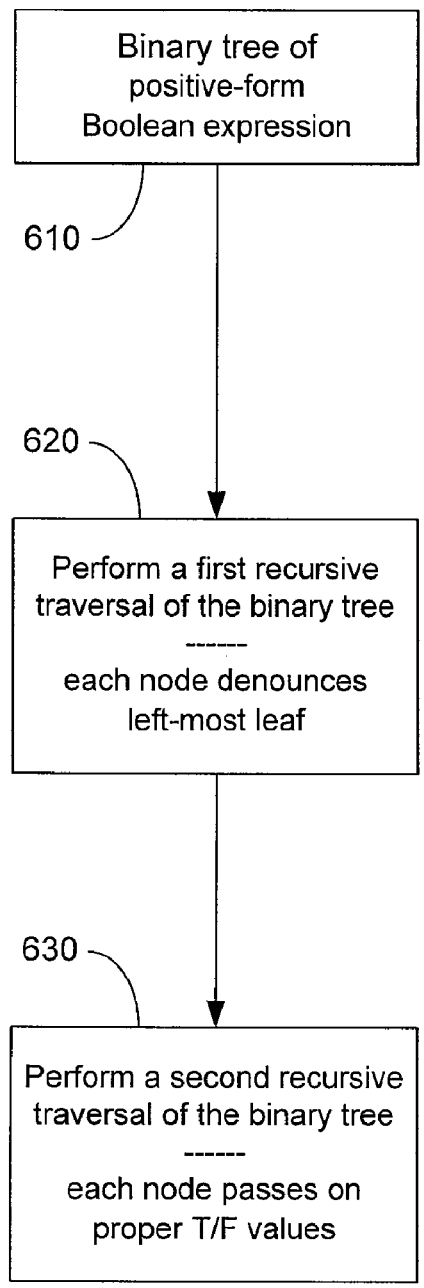
FIG. 6 is a graphical representation of a process to compute and encode a blist circuit for a positive-form expression, such as in FIG. 5, according to an embodiment of the present disclosure.
Figure 6:
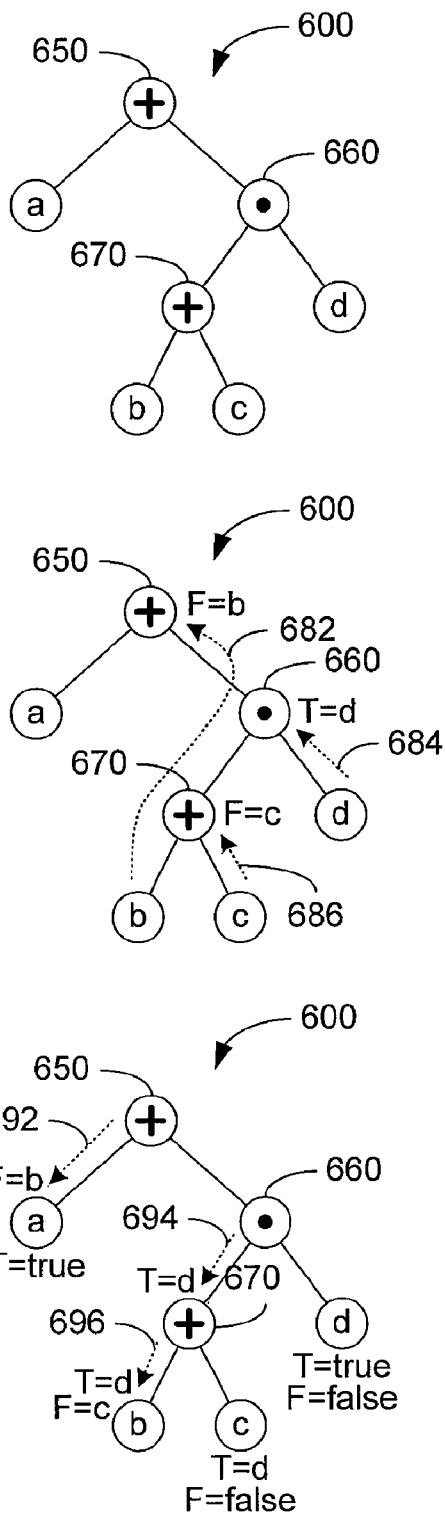
Figure 6:
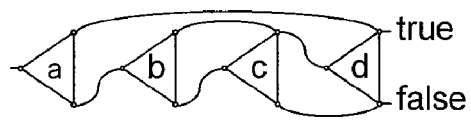

FIG. 6 is a graphical representation of a process to compute and encode a blist circuit for a positive-form expression E, such as in FIG. 5, according to an embodiment of the present disclosure. The algorithm begins at box 610 with the binary tree T of E. In FIG. 6, the exemplary process is performed on a binary tree 600 representing the expression E=a+(b+c)d. The process first performs a recursive traversal of the binary tree of a+(b+c)d at box 620. During that traversal, each node "denounces" to its parent the gate of its left-most leaf. For a gate associated with leaf P, P.F is the left-most leaf of the right child of the lowest '+' node (i.e., the union node with the smallest depth) whose left-child contains P. In addition, for the gate associated with leaf P, P.T is the left-most leaf of the right-child of the lowest '·' node (i.e., the intersection node with smallest depth) whose left-child contains P. In the example of FIG. 6, right-child for root-node 650 is the op-node 660 associated with the sub-expression (b+c)d. The '+' node with the smallest depth of sub-expression (b+c)d is op-node 670. The left-most leaf of op-node 660 is leaf-node 'b'. Thus, op-node 660 denounces 682 to its parent-node 650 that F=b. For '·' node 660, the right-child is leaf-node 'd'. Since the left-most leaf of leaf-node 'd' is itself, leaf-node 'd' denounces 684 to its patent-node 660 that T=d. For '+' node 670, the right-child is leaf-node 'c'. Thus, leaf-node 'c' denounces 686 to its patent-node 670 that F=c. In one embodiment, the first recursive traversal of the tree 600 may be initiated by a call Nodes[0].Img( ) where the code is:

```
gate Img( ) {gate g; if(O==' ') g=G; else {if(O=='+')
    F=R.Img( ); else T=R.Img( ); g=L.Img( ); }; return(g);}
```

At box 630, a second recursive traversal of the tree 600 of E is performed during which each node "passes on" to its left children the appropriate T and F values, depending on the operator. In the example of FIG. 6, root-node 650 passes on 692 to its left-child (leaf-node 'a') the value F=b. Since op-node 670 is the left-child of op-node 660, op-node 660 passes on 694 the value T=d. Op-node 670 then passes on 696 both the value T=d passed 694 from op-node 660 and F=c denounced 686 by leaf-node 'c'. In one embodiment, the second recursive traversal of the tree 600 may be initiated by a call Nodes[0].ptf(Tgate,Fgate), where the code is:

```
void ptf(gate pT, gate pF) {
    if(O==' ') {G.T=pT; G.F=pF; T=pT; F=pF;};
    if(O=='+') {L.ptf(pT,F); R.ptf(pT,pF); };
    if(O=='·') {L.ptf(T,pF); R.ptf(pT,pF); }; }
```

Instead of names for the gates, the process may assign to each gate a "label" (or positive integer identifier). Hence, three labels may be assigned to each gate G: "G.i" identifies the gate G; "G.t" is the identifier of the gate referenced by G.T; and "G.f" is the identifier of the gate referenced by G.F.

Because blist evaluation operates from left-to-right, when a gate G is reached, G.i is no longer needed and may be assigned to another gate that follows G and has not yet been assigned a label. This may be accomplished by initializing the identifier G.i of each gate to −1 and executing the loop:

```
for (int i=0; i<nG; i++) Gates[i].assignLabels( );
followed by
    Gates[0].i=0,
where assignLabels( ) may be implemented as:
    void assignLabels( ) { if(i!=−1) Lab.release(i); if(T.i==−1)
        T.i=Lab.grab( ); t=T.i; if(F.i==−1) F.i=Lab.grab( ); f=F.i; }
```

A simple manager of free labels, called "Lab", may be utilized. Lab keeps track of which labels are in use, and can provide the first (lowest integer) available label (call "Lab.grab") or release a label i that is no longer needed ("Lab.release(i)"). Lab maintains a linked-list of free labels encoded in a table of integers.

Figure 7:
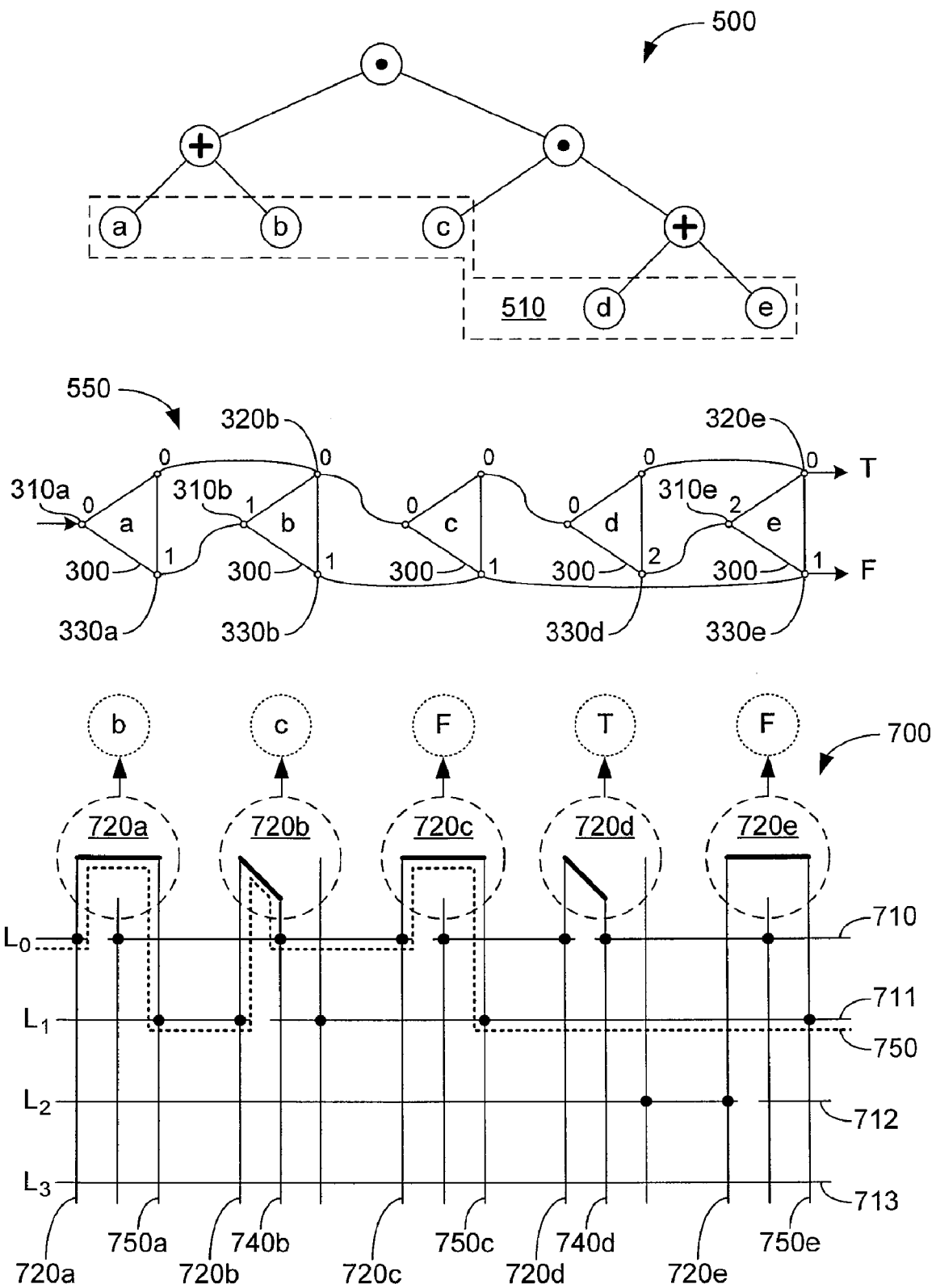
FIG. 7 is a graphical representation of a logic matrix implementing the blist circuit of FIG. 5 according to an embodiment of the present disclosure.

FIG. 7 is a graphical representation of a logic matrix 700 implementing the blist circuit 550 of FIG. 5 according to an embodiment of the present disclosure. A logic matrix (LM) circuit is composed of a series of discontinuous horizontal lines $L_0, L_1 \ldots$ and of a set of gates, each associated with three vertical wires that are connected to one of the horizontal lines. Each gate is associated with a different literal of the implemented expression E, in left-to-right order corresponding to the position of the literal in E. Hence, the literal name is used to identify its associated gate. FIG. 7 illustrates the relationship between the logic matrix 700 and binary tree 500 for the expression (a+b)(c(d+e)) and its blist circuit 550. In the embodiment of FIG. 7, the LM 700 includes four horizontal lines $L_0, L_1, L_2,$ and $L_3$ (710, 711, 712, and 713, respectively) and five gates 720a-720e, each corresponding to literals 510a-510e and blist circuit gates 300a-300e, respectively. Each LM gate 720 includes three wires (or input/output connections): left, central, and right. The left-most wire of each gate is the in-wire 730, which corresponds with input connection 310 of FIG. 3. The central wire is the true-wire 740, which corresponds with the upper output connection 320 of FIG. 3. The right-most is the false-wire 750, which corresponds with the lower output connection 330 of FIG. 3.

The state of a LM gate 720 (up/down) reflects the truth-value (false/true) of the literal. In the representation of the embodiment of FIG. 7, this is the opposite orientation of the blist circuit gate 300 of FIG. 3. In the LM gates 720, the gate 720 connects the in-wire 730 is connected to the true-wire 740 (down position) if the associated literal truth-value is true and to the false-wire 750 (up position) otherwise. In the embodiment of FIG. 7, literals 510a, 510c, and 510e are set to false. Their associated LM gates (720a, 720c, and 720e, respectively) are up allowing current arriving at their in-wire (730a, 730c, and 730e, respectively) to flow to their false-wire (750a, 750c, and 750e, respectively). Literals 510b and 510d are set to true. Their LM gates (720b and 720d, respectively) are down allowing current arriving at their in-wire (730b and 730d, respectively) to flow to their true-wire (740b and 740d, respectively).

Each vertical wire of a LM gate 720 is connected to a discontinuous horizontal line. Note that the connection of a horizontal line with an in-wire 730 of a LM gate 720 is always a T-junction, which implies that current arriving from the horizontal line onto the in-wire 730 of the LM gate 720 will be directed through the gate 720 to either the true-wire 740 or false-wire 750. The connection of a horizontal line with the true-wire 740 and false-wire 750 of the LM gate 720 may be a T-junction or a cross-junction. A cross-junction would allow current arriving on the horizontal line to stay on the horizontal line, hence bypassing the LM gate 720, or current arriving through the LM gate 720 to enter the horizontal line. Current may flow on these horizontal lines between the connections.

To properly connect a LM gate 720, the indices of the lines where its three wires connect can be determined from the blist circuit representing the Boolean expression. In one embodiment, G.i may denote the index of the line where the in-wire 730 of the LM gate 720 connects, G.t may denote the index of the line where the true-wire 740 of the LM gate 720 connects, and G.f to denote the index of the line where the false-wire 750 of the LM gate 720 connects. Hence, the wiring of a LM may be defined by these triplets of indices (G.i,G.t,G.f) for each literal associated with a LM gate. These triplets of indices correspond to those derived earlier. Hence, the wiring of a logic matrix may be derived from the blist circuit of the expression.

For example, in one embodiment, the connection points between horizontal lines (710-713) and gates 720 of the logic matrix and the locations of the discontinuities in the horizontal lines (710-713) may be determined from the blist circuit 550 representing the expression (a+b)(c(d+e)). Connection points may be determined by following paths, from left-to-right, along the blist circuit. Beginning with the input 310a of the blist circuit 550 of FIG. 7, each connection on a path corresponding to horizontal line 710 is labeled zero (0). Where the path passes through a gate 300, the path goes from input 310 to upper output 320. A horizontal line is open (or discontinuous) after a connection to an in-wire 730. For example, line 710 is discontinuous between in-wire 730a and true-wire 740a. Next, beginning with lower output 330a, each connection on a path corresponding to horizontal line 711 is labeled one (1). Where the path passes through a gate 300, the path goes from input 310 to upper output 320 unless the output 320 has already been assigned. Then, the path goes from input 310 to lower output 330. For example, the path labeled one passes from input 310b to lower output 330b because upper output 320b had been assigned to line 710. Also, line 711 is discontinuous to the right of the connection to in-wire 730b. Working left-to-right, the next unassigned blist circuit gate connection is labeled two (2) corresponding to a connection on line 712. In the embodiment of FIG. 7, lower output 330d is unassigned and labeled two. The path then passes to input 310e, which is also labeled two. Because both the upper output 320e and the lower output 330e have been assigned, the path ends. Also note that line 712 is discontinuous to the right of (or after) the connection to in-wire 730e. Note that line 713 is not utilized.

In the embodiment of FIG. 7, the destination of the current output from a LM gate 720 is indicated in a circle above the gate 720. A literal name marked in the circle, for example 'b' above LM gate 720a, indicates that, given the shown state (truth-value) of gate 720a, current arriving on the in-wire 730a of gate 720a would eventually reach the in-wire 730b of LM gate 720b. A 'T' marked in the circle above gate, for example above LM gate 720d, indicates that if current were to arrive on the in-wire 730d of gate 720d, it would reach the output at right side of the top-most line 710, regardless of the state of all subsequent gates, indicating that the expression evaluates to true for the given set of literal states. An 'F' marked in the circle, for example above LM gate 720c, indicates that, given the present state of gate 720c, if current were to arrive on the in-wire 730c of LM gate 720c, it would then reach the right side of another line, different from line 710, indicating that the expression evaluates to false regardless of the state of subsequent gates.

The passage of current through the LM 700 for the initial input vector (truth-values of the literals) defined above (i.e., 510a=false, 510b=true, 510c=false, 510d=true, 510e=false) is shown by line 750. Because in this figure the current does not arrive to the right output of horizontal line 710, we conclude that, with these input values, the expression evaluates to false. Switching LM gate 720c (setting the truth-value of literal 510c to true) changes the passage of the current through the LM 700, so that it ends on the output of line 710 implying that, for the new input vector of literal truth-values, the expression evaluates to true. Regardless of the complexity of an expression E, the truth-value of E is available instantaneously as soon as the gates have commuted to their proper position When LM gate 720c is switched, the literal marked in the circle above gate 720c changes from 'F' to 'e'. For a LM gate 720 designated associated with literal G, G.T may be used to denote its value when G is true and G.F otherwise. Hence, G.T is the name of the gate to which current would flow next if it were to arrive on the in-wire 730 of the LM gate 720 when literal G is true. Similarly, G.F is the name of the gate to which current would flow next if it were to arrive on the in-wire 730 of the LM gate 720 when G is false.

A logic matrix may be utilized in a GPU (graphics processing unit) or other dedicated graphics rendering devices including, but not limited to, dedicated graphics cards, integrated graphic solutions, and hybrid solutions. The logic matrix may be used in a broad variety of applications including graphical design, simulation, and animation. The logic matrix may be programmable, which may be altered using software. This permits the logic matrix to be changed for evaluations of other Boolean expressions. Continued reduction of the size and memory usage, as well as the solution time, may improve operation of GPUs. The regularity of LM layouts enhance their scalability and application.

In one embodiment, among others, the "cost" of a blist expression may be defined as the number of different gate names used to evaluate the expression. The number of arcs passing through the interval between two consecutive gates in the blist circuit is the same as the number of different names that need to be available for identifying the next gate. Hence, this maximum number of arcs in all intervals of a blist circuit is the cost for this embodiment. The cost may be represented graphically as the maximum number of arcs (or connections between gates) intersected by a vertical line associated with the interval between the gates. Each arc going left-to-right from a (source) gate towards a subsequent (target) gate is associated with the name of the target gate. As evaluation progresses from left to right, arcs are born at their source gate and die at their target gate. At any given moment, all arcs being evaluated (alive) have different names.

Figure 8:
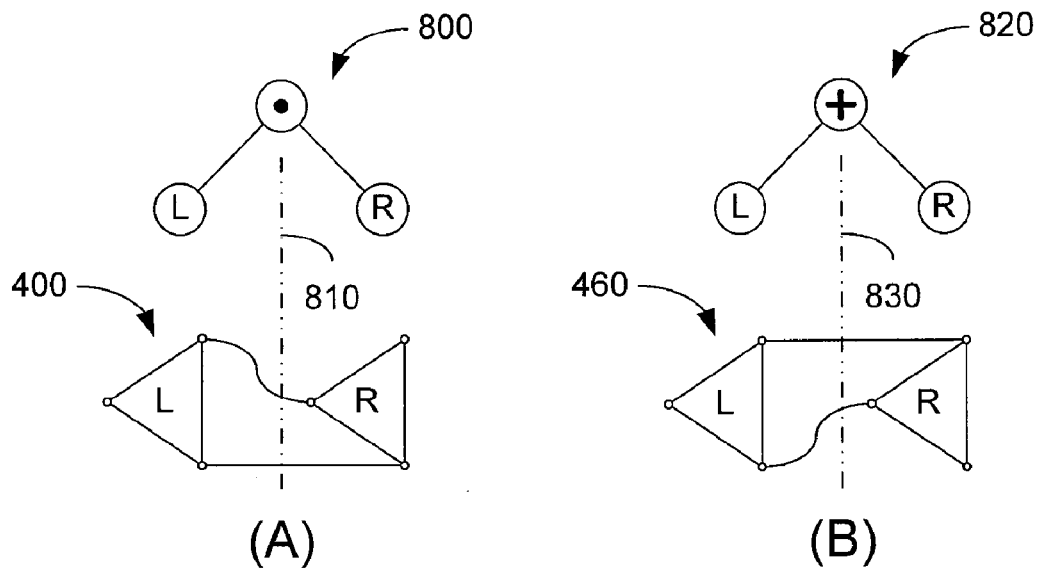
FIG. 8 is a graphical representation of the evaluation of the cost of the blist circuits of FIGS. 4 and 5 according to an embodiment of the present disclosure.
Figure 8:
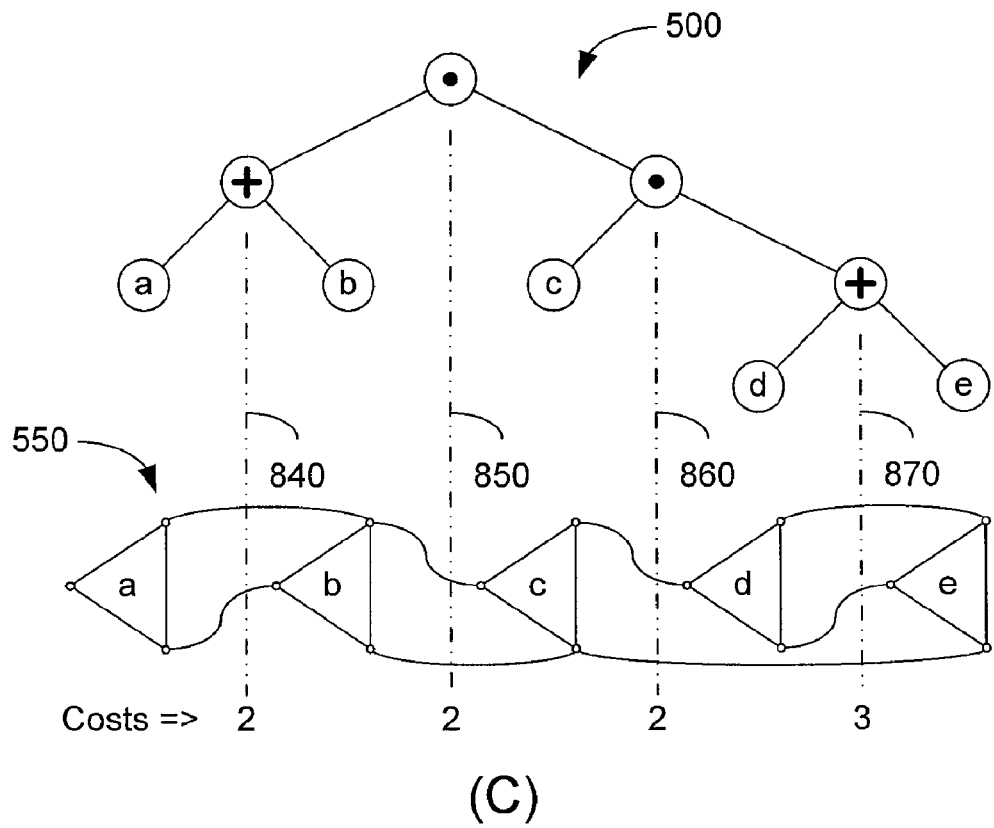

FIG. 8 is a graphical representation of the evaluation of the cost of the blist circuits of FIGS. 4 and 5 according to an embodiment of the present disclosure. The binary tree 800 and blist circuit 400 for the expression LR are illustrated in FIG. 8(A). The number of arcs intersected by vertical line 810 in the interval (L,R) is two, so LR has a cost of two. Similarly, the binary tree 820 and blist circuit 460 for the expression L+R are illustrated in FIG. 8(B). The number of arcs intersected by vertical line 830 is two, thus L+R has a cost of two. The binary tree 500 and blist circuit 550 for the more complex positive-form expression (a+b)(c(d+e)) of FIG. 5 are illustrated in FIG. 8(C). For this expression, the number of arcs intersected by each of the vertical lines 840, 850, and 860 in intervals (a,b), (b,c), and (c,d), respectively, is two. However, the number of arcs intersected by the vertical line 870 in interval (d,e) is three. As the maximum number of arcs intersected by a vertical line is three, the cost of expression (a+b) (c(d+e)) is three.

Figure 9:
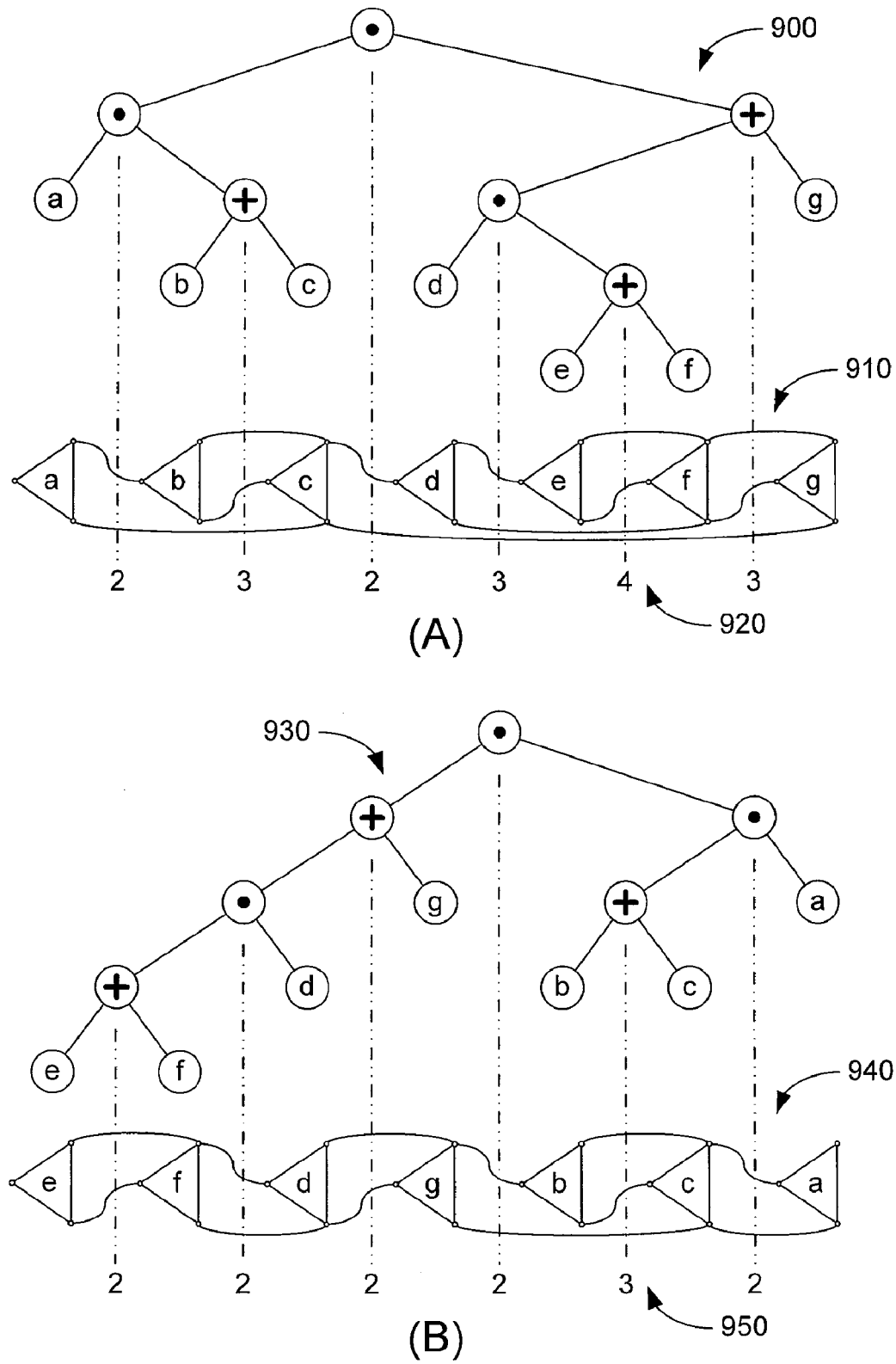
FIG. 9 is an illustration of the difference in cost after converting an expression to left-heavy form using the cost evaluation of FIG. 8 according to an embodiment of the present disclosure.

Making a binary tree T left-heavy, as discussed in "Blister: GPU-based rendering of Boolean combinations of free-form triangulated shapes" by Hable, J. and Rossignac, J., (*ACM Transactions on Graphics* (*SIGGRAPH*), 24(3):1024-1031, 2005), the entirety of which is hereby incorporated by reference may decrease the cost. FIG. 9 is an illustration of the difference in cost after converting an expression to left-heavy form using the cost evaluation of FIG. 8. FIG. 9(A) illustrates the binary tree 900 and the blist circuit 910 for the expression a(b+c)(d(e+f)+g). Because there are four arcs intersecting the line in the interval (e,f) 920, the cost is four. Pivoting a(b+c) (d(e+f)+g) into its left-heavy form produces the expression ((e+f)d+g)((b+c)a) with a binary tree 930 and blist circuit 940 as illustrated in FIG. 9(B). Because there are three arcs intersecting the line in the interval (b,c) 950, the left-heavy form reduces the cost to three. Left-heavy pivoting may be implemented as follows:

| | |
|---|---|
| int pH( ) { if(O==' ') return(0); | // return if reached a leaf-node |
| int cL=L.pH( ); int cR=R.pH( ); | // otherwise recurse |
| if(cR>cL) {node N; N=L; L=R; R=N; }; | // swap |
| return (1+max(cL,cR)); } | // return height of node |

Unfortunately, making the binary tree T left-heavy may not minimize the cost. For example, the expression ((a+b)c+d)e+ f+(g+h+i+j+k+l+m+n) has a cost of two. Pivoting the expression to provide the left-heavy form g+h+i+j+k+l+m+n+((a+b)c+d)e+f, increases the cost to three. A more complex decision making process may be used to decide which nodes to pivot.

To reduce the cost, each node may be associated with a Boolean 'tt' and three costs: c1, c2, and c3. Their values (collectively called the "price-tag") may be displayed as a 4 characters string with no separators. The first character is the Boolean tt, which is 't' when true and T otherwise. The other three costs are each a digit representing the integer value of costs c1, c2, and c3, respectively.

Figure 10A:
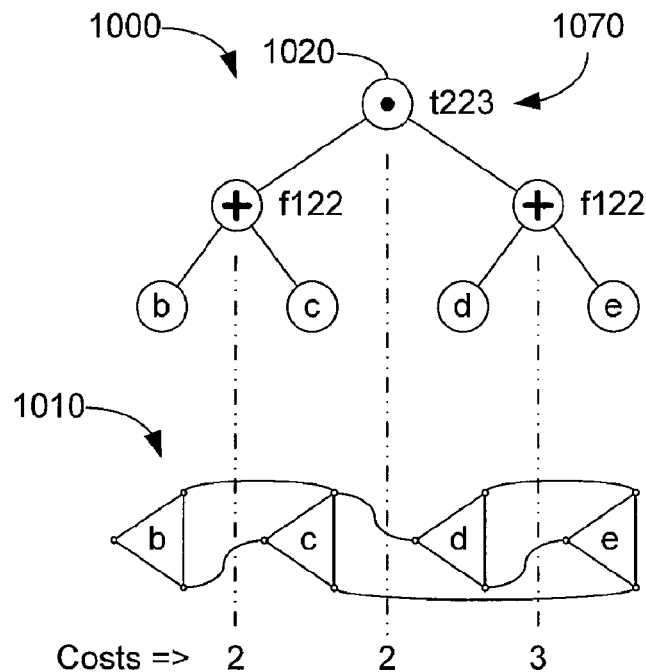
FIGS. 10A-10C illustrate the determination of a price-tag for the positive-form expression (b+c)(d+e) according to an embodiment of the present disclosure.
Figure 10B:
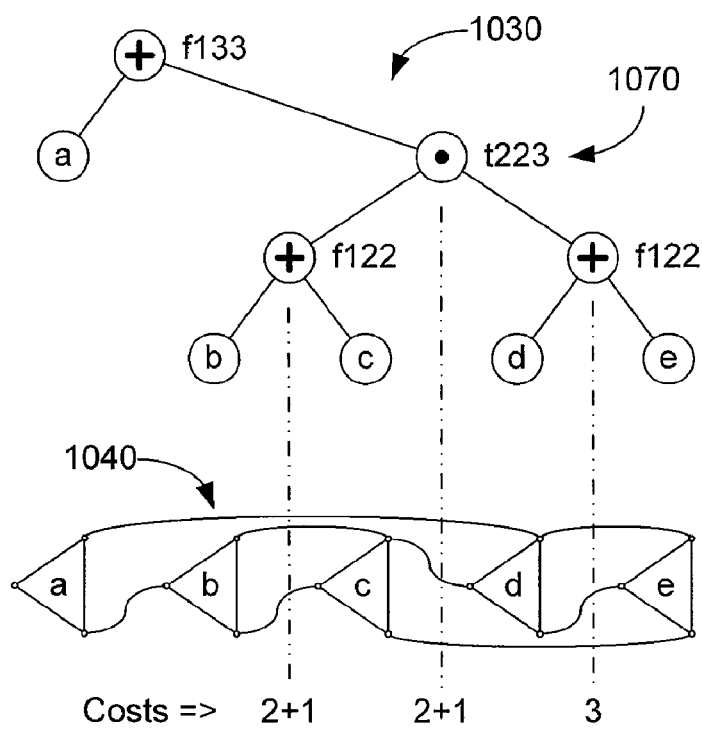
Figure 10C:
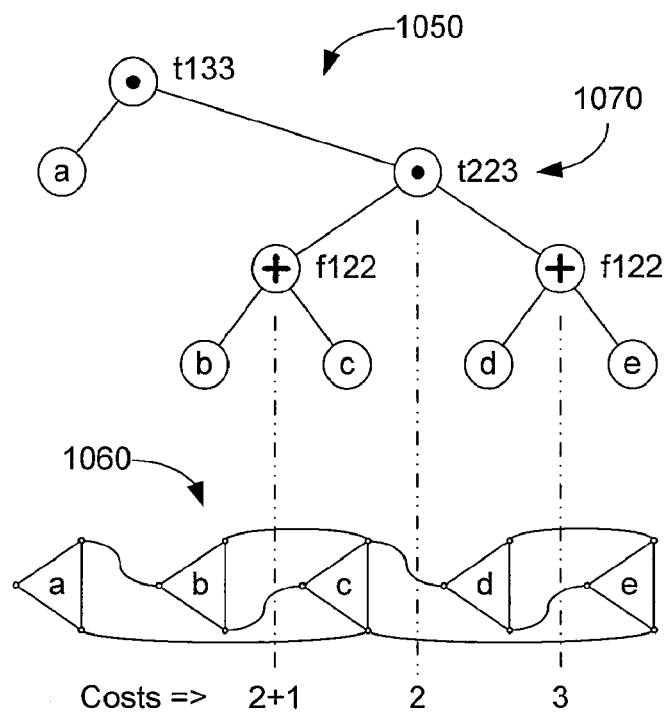

To understand these three costs, consider the illustrations of FIGS. 10A-10C. FIGS. 10A-10C illustrate the determination of a price-tag for the positive-form expression (b+c)(d+e) according to an embodiment of the present disclosure. Consider first the expression R=(b+c)(d+e), for which the binary tree 1000 and blist circuit 1010 are illustrated in FIG. 10A. It has three intervals between consecutive gates: (b,c), (c,d), and (d,e). The cost of an interval is the number of lines (or arcs) in the interval. Hence, the three costs of intervals (b,c), (c,d), and (d,e) are 2, 2, and 3, respectively.

Next, consider the expression E=L+R, where the left-child of the root-node is the leaf-node 'a' (L=a) and the right-child is the expression R=(b+c)(d+e). FIG. 10B illustrates the binary tree 1030 and blist circuit 1040 for the expression a+(b+c)(d+e). Notice that the costs of intervals (b,c) and (c,d) have increased by one, while the cost of interval (d,e) has not changed. Finally, consider the expression E=LR, where L=a is the left-child and R is the right-child. FIG. 10C illustrates the binary tree 1050 and blist circuit 1060 for the expression a((b+c)(d+e)). Notice that the cost of interval (b,c) has increased by one, while the costs of intervals (c,d) and (d,e) have not changed. These changes do not depend on L. Also note that the input to R becomes the interval (a,b) having an increased cost of two in both the expressions L+R and LR.

The value of price-tag cost c1 is the maximum cost for the intervals that increase for both expressions L+R and LR. In the exemplary embodiment of FIGS. 10A-10C, only the cost of interval (b,c) increased for both expressions L+R and LR. Because the cost of interval (b,c) is the maximum of all intervals that increase for both expressions L+R and LR, the cost for c1 is R.c1=2. The value of price-tag cost c3 is the maximum cost for the intervals that do not increase in either expression L+R or LR. In the embodiment of FIGS. 10A-10C, only the cost of interval (d,e) never increased for both expressions L+R and LR. Because the cost of interval (d,e) is the maximum of all intervals that never increased, the cost for c3 is R.c3=3.

The value of price-tag cost c2 is the maximum cost for the remaining intervals. In the embodiment of FIGS. 10A-10C, note that the cost of interval (c,d) increased for the expression L+R, but not for the expression LR. Because the cost of interval (c,d) is the maximum of all intervals that increase for either L+R or LR (but not both), the cost for c2 is R.c2=2. The value of Boolean tt is also determined by the change in the remaining intervals. Since the cost of interval (c,d) only increases for L+R, the Boolean R.tt=true. Hence, the Boolean (tt) and the three costs (c1, c2, c3) of the top node 1020 representing the expression R are t, 2, 2, 3, respectively, and the price-tag 1070 of R is t223 as indicated in FIGS. 10A-10C.

More generally, the intervals of an arbitrary expression R may be classified in 3 sets of one or more intervals by considering whether the cost of the interval would increase in the expression L+R and/or in LR, where L is a leaf-node. First consider all the intervals for which cost increases both in L+R and in LR. Notice that, if they exist, they are consecutive and found at the beginning of R. The price-tag cost c1 associated with R, and denoted R.c1, is the maximum of their costs in the expression R. Now consider all the intervals for which cost remains constant both in L+R and in LR. Notice that, if they exist, they are consecutive and at the end of expression R. The cost R.c3 is the maximum of their costs. Finally, consider the remaining intervals. Note that they are also consecutive in expression R. The maximum of their cost in expression R is R.c2. The Boolean tt associated with R is set as follows: R.tt=true if the cost of these (c2) intervals would be increased in L+R, tt=false if the cost of these intervals is increased in LR. The price-tag of a leaf-node is initialized to t102. In addition, the price-tag for the expression of a union ('+') of two leaf-nodes is f122 and the price-tag for the expression of an intersection ('·') of two leaf-nodes is t122. These price-tags can be derived by considering the blist circuit input and output connections.

Figure 11A:
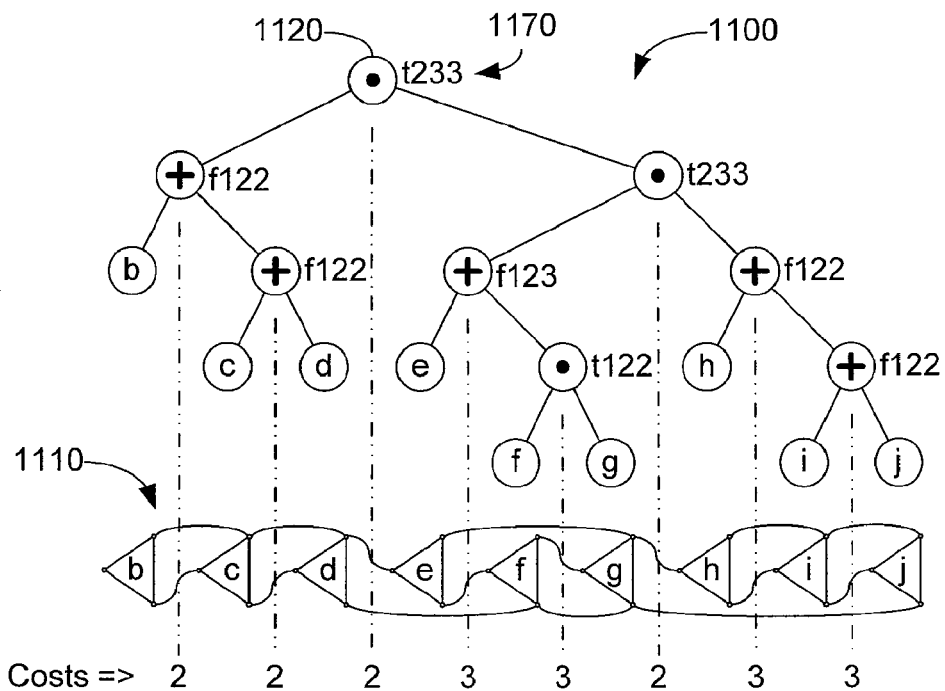
FIGS. 11A-11C illustrate the determination of a price-tag for the positive-form expression (b+(c+d))((e+fg)(h+(i+j))) according to an embodiment of the present disclosure.
Figure 11B:
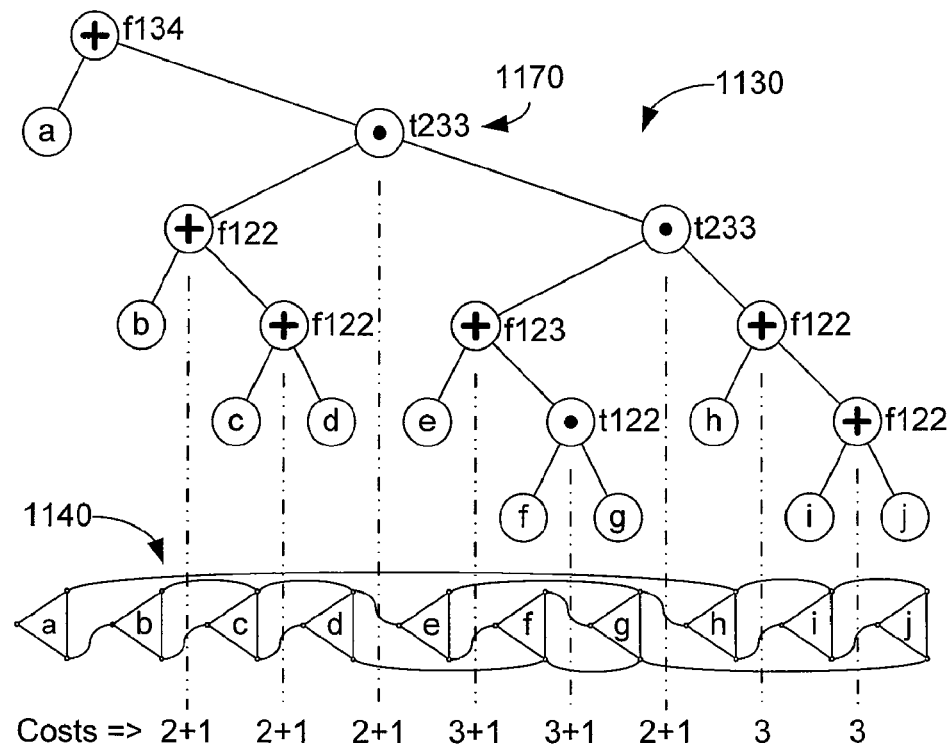
Figure 11C:
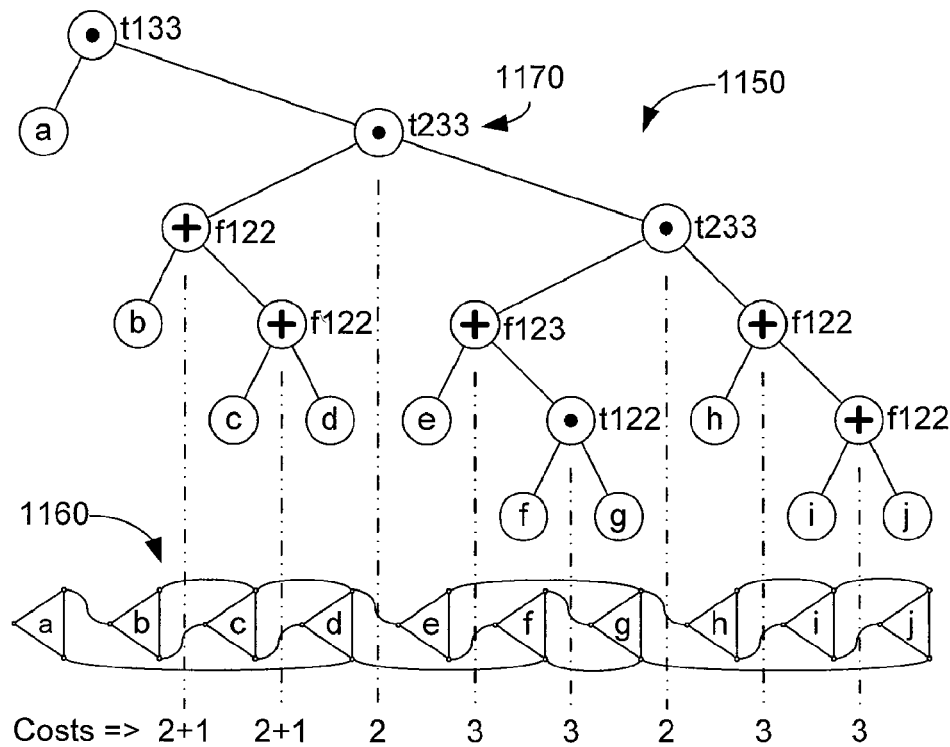

A more complex example with several intervals associated with each cost (c1,c2,c3) is illustrated in FIGS. 11A-11C. FIGS. 11A-11C illustrate the determination of a price-tag for the positive-form expression (b+(c+d))((e+fg)(h+(i+j))) according to an embodiment of the present disclosure. FIG. 11A illustrates the binary tree 1100 and blist circuit 1110 for the expression R=(b+(c+d))((e+fg)(h+(i+j))). The costs of intervals (b,c), (c,d), (d,e), (e,f), (f,g), (g,h), (h,i), and (l,j) are 2, 2, 2, 3, 3, 2, 3, and 3, respectively. Next, consider the expression E=L+R, where L=a. FIG. 11B illustrates the binary tree 1130 and blist circuit 1140 for the expression E=a+(b+(c+d))((e+fg)(h+(i+j))). The costs of intervals (b,c) through (g,h) have increased by one, while the cost of intervals (h,i) and (i,j) have not changed. Finally, consider the expression E=LR, where L=a. FIG. 11C illustrates the binary tree 1150 and blist circuit 1160 for the expression a(b+(c+d)) ((e+fg)(h+(i+j))).

Notice that the cost of intervals (b,c) and (c,d) have increased by one, while the costs of intervals (d,e) through (i,j) have not changed. Because the cost for intervals (b,c) and (c,d) increased for both L+R and LR, they are associated with the price-tag cost c1. Since the maximum cost of intervals (b,c) and (c,d) is two, R.c1=2. Because the cost for intervals (h,i) and (i,j) never changed, they are associated with price-tag cost c3. Since the maximum cost of intervals (h,i) and (i,j) is three, R.c3=3. The remaining intervals, (d,e) through (g,h) are associated with price-tag cost c2. Because the maximum cost of these intervals is three, R.c2=3. In addition, since the cost of intervals, (d,e) through (g,h) increased for L+R and not LR, tt=t. Hence, the price-tag 1170 of the expression (b+(c+d))((e+fg)(h+(i+j))) associated with op-node 1120 (FIG. 11A) is t233.

The price-tags associated with the op-nodes of a binary tree T representing an expression may be used to reduce the cost of the expression by determining a set of pivots that will minimize the cost of the root. A cost measure for a node P may be determined as max(P.c1,P.c2,P.c3). In an expression, there are n−1 op-nodes and hence $2^{n-1}$ different sets of pivots which may be used. Clearly, this large number of options prohibits an exhaustive search for complex expressions with multiple literals. A greedy optimization process using a recursive traversal of T may be used to decide which node to pivot in a bottom-up order without evaluating all $2^{n-1}$ sets of pivots. While doing so, and after each pivot, the process updates the price-tag of op-node P using the price-tags of its left and right children, L and R.

In one embodiment, among others, the price-tag associated with a node may be computed from the price-tags of its left and right children. To compute the price-tag of a node P from the price-tags of its children L and R, the price-tag variables of P are identified by tt, c1, c2, and c3, while the same variables are identified for L by L.tt, L.c1, L.c2, and L.c3 and for R by R.tt, R.c1, R.c2, and R.c3. When the operator O of node P is '·' (intersection), tt is set to true for node P and four cases corresponding to the four combinations of truth-values of L.tt and R.tt are considered.

```
void pricetag( ) {
    tt=O=='·';
        if((tt&& L.tt&& R.tt) || (!tt&&!L.tt&&!R.tt)) {
    c1=L.c1; c2=max(max(L.c2,L.c3),max(R.c1+1,R.c2)); c3=R.c3;};
        if((tt&& L.tt&&!R.tt) || (!tt&&!L.tt&& R.tt)) {
    c1=L.c1; c2=max(L.c2,L.c3,R.c1+1); c3=max(R.c2+1,R.c3);};
        if((tt&&!L.tt&& R.tt) || (!tt&& L.tt&&!R.tt)) {
    c1=max(L.c1,L.c2); c2=max(L.c3,R.c1+1,R.c2); c3=R.c3;};
        if((tt&&!L.tt&&!R.tt) || (!tt&& L.tt&& R.tt)) {
    c1=max(L.c1,L.c2); c2=max(L.c3,R.c1+1); c3=max(R.c2+1,R.c3);}; }
```

Figure 12:
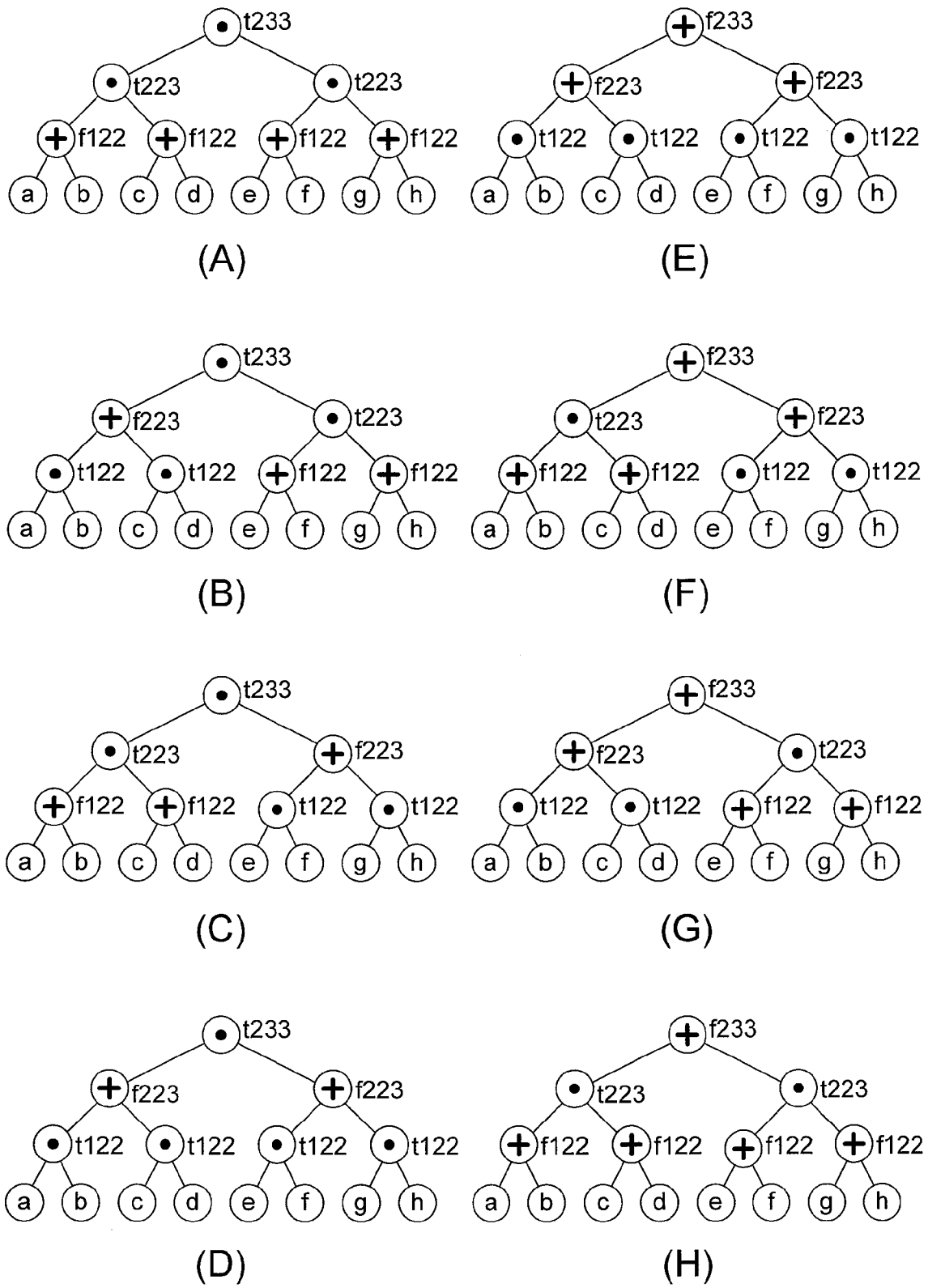
FIG. 12 is an illustration of binary trees corresponding to the four truth-value combinations used to derive the node price-tags of FIGS. 10A-10C and 11A-11C from the node's children according to an embodiment of the present disclosure.

The formulae c1, c2, and c3 are derived by considering the four cases illustrated in FIGS. 12(A-D) from top-to-bottom and correspond to the four lines in pricetag top-to-bottom. When the operator O of node P is '+', tt is set to false for node P and the four cases are considered. The four cases for a '+' operator are symmetric and may be derived from the cases illustrated in FIGS. 12(E-H). FIG. 12 is an illustration of binary trees corresponding to the four truth-value combinations used to derive the node price-tags of FIGS. 9A-9C and 10A-10C from the node's children according to an embodiment of the present disclosure. The operators are reversed between FIGS. 12(A-D) and 12(E-H), respectively. Other embodiments may include price tags with different multiples of cost values. For example, additional cost values may be based upon the price-tags of the left and right children of the children of the parent node.

FIG. 12 is an illustration of binary trees corresponding to the four truth-value combinations used to derive the price-tag of a node from its children nodes. The tree of FIG. 12(A) represents the expression (a+b)(c+d)((e+f)(g+h)) while the tree of FIG. 12(E) represents the expression ab+cd+(ef+gh). Similarly, FIGS. 12(B) and 12(F) represent (ab+cd)((e+f)(g+h)) and ab+cd+(e+f)(g+h), respectively, FIGS. 12(C) and 12(G) represent (a+b)(c+d)(ef+gh) and ab+cd+(e+f)(g+h), respectively, and FIGS. 12(D) and 12(H) represent (ab+cd)(ef+gh) and (a+b)(c+d)+(e+f)(g+h), respectively.

Figure 13:
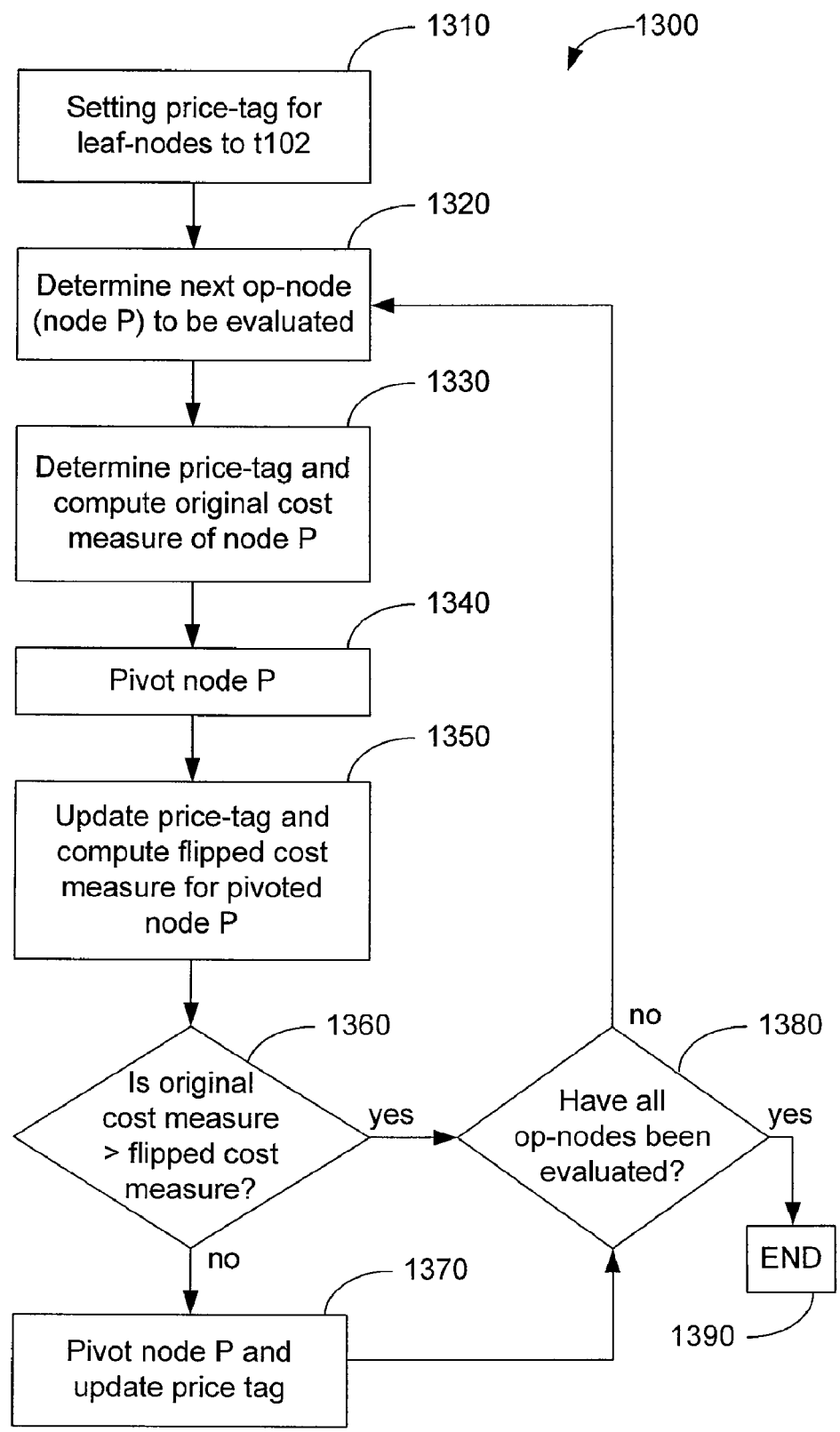
FIG. 13 is a flow diagram of a process to reduce the cost of a blist circuit representing a positive-form expression, such as in FIG. 5, according to an embodiment of the present disclosure.

FIG. 13 is a flow diagram of a process 1300 to reduce the cost of a blist circuit representing a positive-form expression, such as in FIG. 5, according to an embodiment of the present disclosure. In one embodiment, among others, the process 1300 begins by setting the price-tag for the leaf-nodes to t102 in box 1310. Then, in box 1320, determine the next op-node (e.g. node P) to be evaluated in a bottom-up order. In one embodiment, the bottom-up order is based upon depth of the op-node. In some embodiments, nodes with the same depth may be evaluated in left-to-right order. In another embodiment, bottom-up order is based upon the rows of a binary tree representing the expression. Once node P is determined, the price-tag and original cost measure of P is computed in box 1330. Node P is then pivoted by flipping the positions of the left-child and right-child (box 1340). The price-tag is updated and a flipped cost measure is computed for pivoted node P in box 1350. If the original cost measure does not exceed the flipped cost measure (1360), then node P is pivoted back by flipping the left-child and right-child back to their original positions and the price-tag is updated again in box 1370. If all of the op-nodes have been evaluated (1380), then the process ends (1390), otherwise the process repeats by returning to box 1320 to determine the next op-node to be evaluated.

In one embodiment, a recursive call to flipper for the left and right children, L and R, of node P, reduces their cost. The price-tag of op-node P is computed by a call to pricetag and originalCost measure is computed by a call to costMeasure. Then, a call to flip pivots node P, updates the price-tags and computes the flippedCost measure. If the originalCost measure does not exceed the flippedCost measure, flipper pivots P back and updates the price-tag again. This may be implemented as follows:

```
void flipper( ) {if(O==' ') {c1=1; c2=0; c3=2; tt=true;} else {
    L.flipper( ); R.flipper( ); pricetag( );
    int originalCost=costMeasure( ); flip( ); pricetag( );
    int flippedCost=costMeasure( );
        if (originalCost<=flippedCost) {flip( ); pricetag( );}; }; }
```

The procedure flip simply swaps references to the two children nodes using an auxiliary variable N.

void flip( ){node N; N=L; L=R; R=N;}

The decision to flip a given node P may be encoded in the function costMeasure, which uses price-tag costs c1, c2, and c3 to compute a measure of cost, which defines whether we should pivot the node P or not. To reduce the maximum of the number of lines used in any interval, a naïve solution may to pivot an op-node P if the pivot reduces the cost of P defined earlier as max(c1,c2,c3). Hence, a naïve implementation of costMeasure is:

int costMeasure (int c1, int c2, int c3) {return max(c1,c2, c3);}

Unfortunately, this naïve solution may, in fact, actually increase the cost. While the naïve solution will pivot a node if the maximum of the three price-tag costs is reduced, it will not pivot a node if only one of two price-tag costs at the maximum value is reduced (e.g., if t233 is reduced to t223). For example, using the naïve costMeasure to improve the cost 3 expression (a+b)((c+d)e)+(fg+(h+i)(j+kl)) produces the cost 4 expression (a+b)((c+d)e)+((h+i)(kl+j)+fg). The naïve approach fails to pivot (h+i)+(kl+j), which has a price-tag of t233 into (kl+j)+(h+i), which has a price tag t223, because this pivot would not reduce the max of the three costs, which is 3 in both cases.

To improve the cost reduction, a modified costMeasure may be used, which (as in the naïve implementation) performs a pivot when such a pivot reduces the cost of the node. However, when the original and pivoted versions of the node have the same (maximum) cost, our modified version of cost-Measure uses the other two costs to decide whether to pivot or not. In one embodiment, among others, the costMeasure may be computed as follows:

```
int costMeasure( ) {int cmax=max(c1,c2,c3);
    int cmin=min(c1,c2,c3); int cmid=c1+c2+c3−cmax−cmin;
    return cmax*10000+cmid*100+cmin;}
``` where for simplicity, it is assumed that there are less then $2^{100}$ literals. In this way, all price-tag costs are considered in the evaluation. In reference to FIG. 13, rather than computing the original and flipped cost measures in boxes 1330 and 1350, the original and flipped modified cost measures are computed and used to determine if the original modified cost measure is greater than the flipped modified cost measure at 1360. If the original modified cost measure is not greater, then the node is pivoted and the price-tag updated in box 1370. This modified solution often improves upon the naïve solution. Notice that the space and time computational complexity of the described process is linear in the number n of literals. In addition, the implementation requires significantly less than 1/1,000,000 of a second per literal.

Figure 14A:
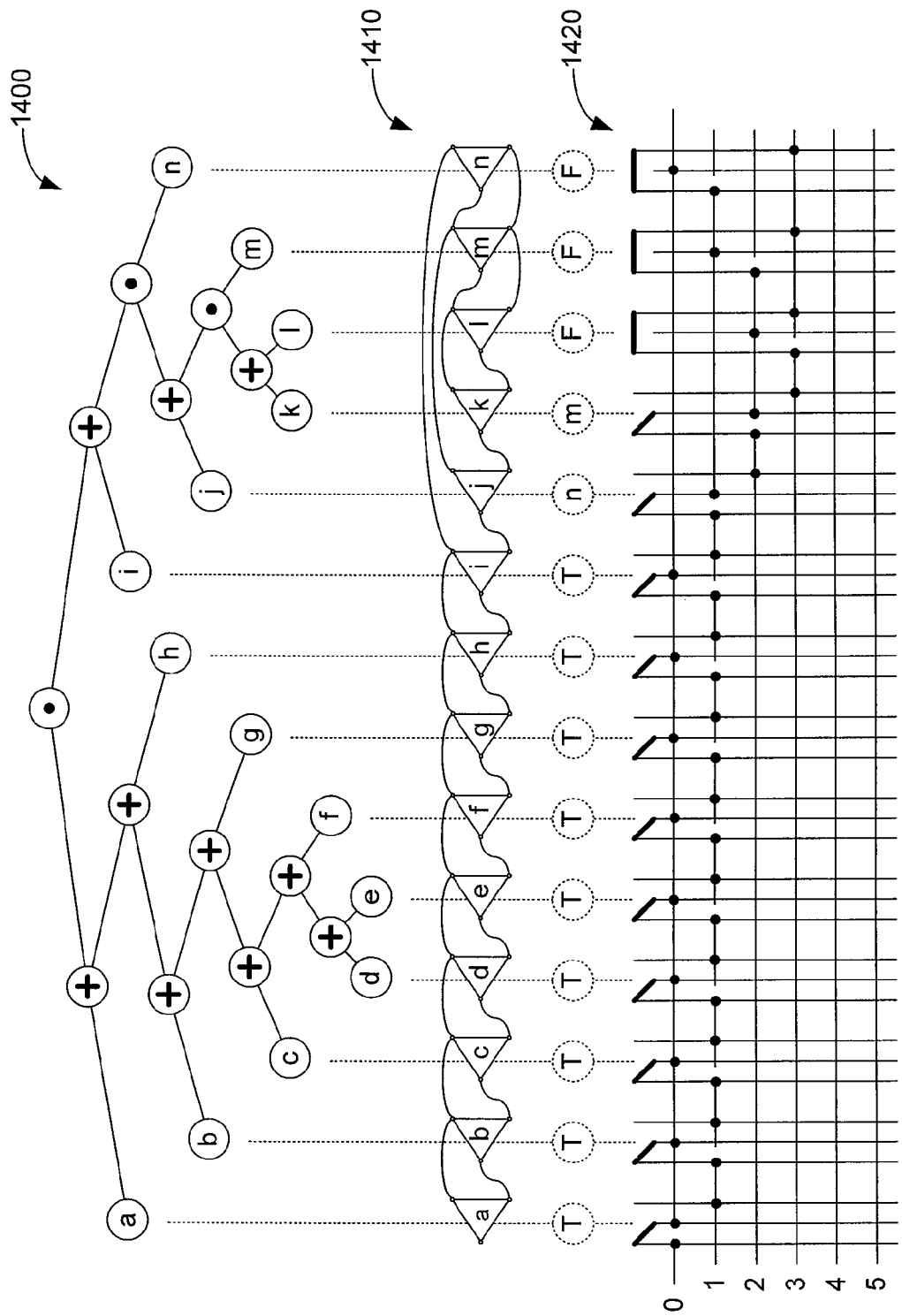
FIGS. 14A and 14B illustrate the size reduction of a logic matrix of FIG. 7 for the expression a+(b+(c+(d+e+f)+g)+h)+(i+(j+(k+l)m)n) using the cost reduction process of FIG. 13 using modified cost measures according to an embodiment of the present disclosure.
Figure 14B:
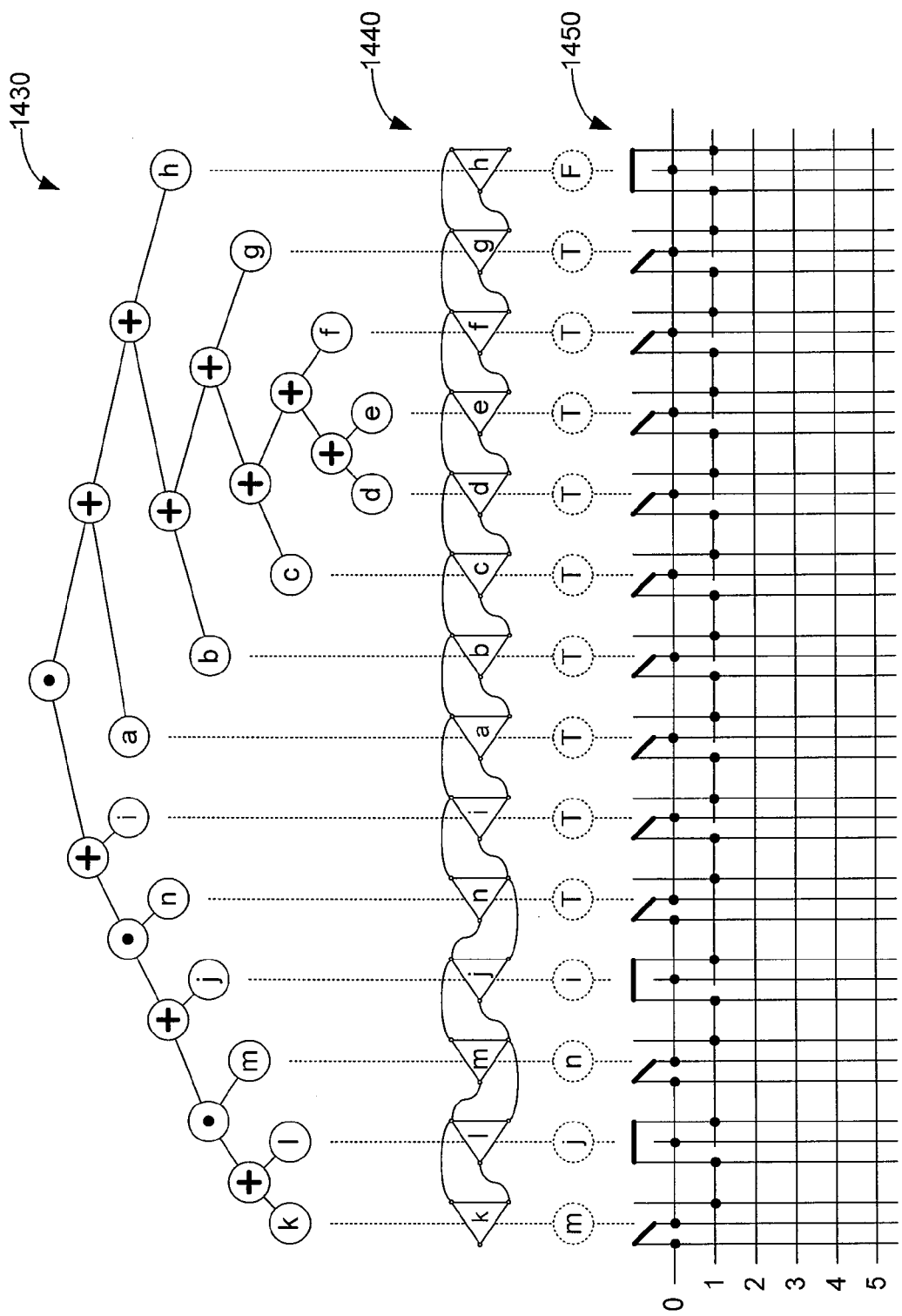

In order to accommodate large Boolean expressions in a finite size logic matrix (LM), it is desirable to reduce the number of lines needed to implement the LM. The reduced Boolean form described above may be used to achieve this. FIGS. 14A and 14B illustrate the size reduction of a logic matrix of FIG. 7 for the expression a+(b+(c+(d+e+f)+g)+h)+(i+(j+(k+l)m)n) using the process of FIG. 13 using modified cost measures according to an embodiment of the present disclosure. In the embodiment of FIG. 14A, the expression a+(b+(c+(d+e+f)+g)+h)+(i+(j+(k+l)m)n) is represented by binary tree 1400 and a corresponding blist circuit 1410. The blist circuit 1410 is implemented as logic matrix 1420 using the procedures previously described. LM 1420 utilizes four horizontal lines to connect the LM gates in accordance with blist circuit 1410.

The process of FIG. 13 using modified cost measures was used to reduce the cost of expression a+(b+(c+(d+e+f)+g)+h)+(i+(j+(k+l)m)n), resulting in an improved Boolean version. In the embodiment of FIG. 14B, the reduced cost expression is represented by binary tree 1430 and a corresponding blist circuit 1440, which was implemented as LM 1450. It can be seen in FIG. 14B that the reduced cost LM 1450 only utilizes two horizontal lines, resulting in reduced size for LM 1450.

An upper bound on the lowest number m(c) of literals that require a given cost c may be established by considering only expressions whose cost cannot be reduced by any pivot operation. It can be shown that the relationship may be described by $m(c)=3\times2^{c-2}-2$. where $c \geq 2$. Consequently, the number of lines (j) required by an OBE of n literals is less or equal to $j=\lceil \log_2(2n/3+2) \rceil$. For example, the upper bound ma) on the number of literals for which j lines suffice may be determined to be: m(2)=3, m(3)=9, m(4)=21, m(5)=45, m(6)=93, m(7)=189, m(8)=381, m(9)=765, m(10)=1,533, m(11)=3,069, m(12)=6,141, m(13)=12,285, m(14)=24,573, m(15)=49,149, m(16)=98,301, m(17)=196,605, m(18)=393,213, m(19)=786,429, m(20)=1,572,861.

In one embodiment, to evaluate an expression E on programmable hardware in a single clock cycle (with no latency), the logic matrix implementation may be used. In alternate embodiments, a latency of n cycles is acceptable, we can use a logic pipe (LP) with a stream of staggered input vectors, which uses n gates, each one connected to the next one by only $\lceil \log_2 \lceil \log_2(2n/3+2) \rceil \rceil$ lines, to produce at each cycle the truth-value of expression E for a new input vector.

Figure 15:
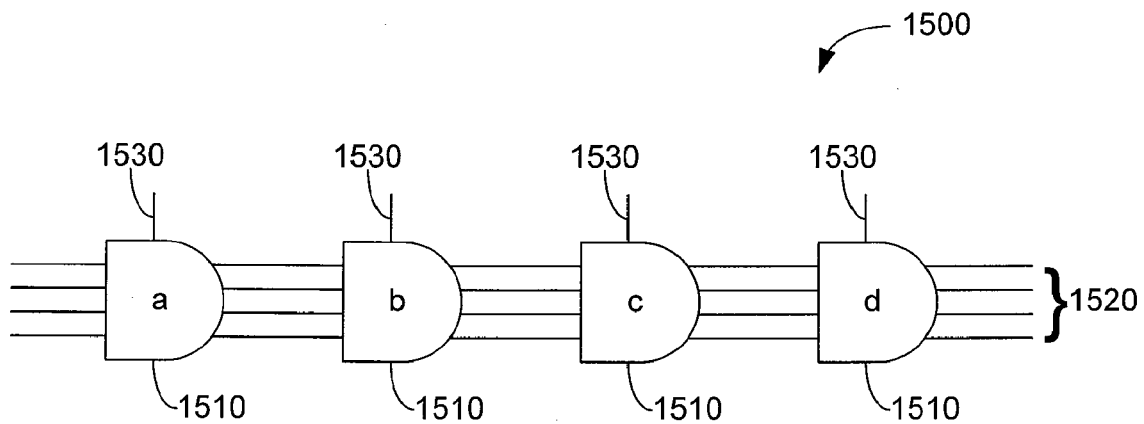
FIG. 15 is an illustration of a logic pipe for implementing a blist circuit such as in FIG. 5 according to an embodiment of the present disclosure.

FIG. 15 is an illustration of a logic pipe 1500 for implementing a blist circuit such as in FIG. 5 according to an embodiment of the present disclosure. The logic pipe (LP) 1500 uses n gates 1510 connected by a pipe of $\lceil \log_2 j \rceil$ lines 1520, where $j=\lceil \log_2(2n/3+2) \rceil$. Truth-values of an input vector of the literal states are provided to each gate 1510 through an input connection 1530. When the input vectors are staggered, so that each gate reads a different truth-value bit of a different input vector, the LP produces at each cycle a new value of the logical expression corresponding to the next input vector. However, in contrast to an LM, where the current passes through a single line in each segment between LM gates, the LP transmits the identifier (ID) of the next literal from one LP gate to the next along the group of lines 1520 (or pipe). The logic pipe may be programmable, which may be altered using software. This permits the logic pipe to be changed for evaluations of other Boolean expressions. In one embodiment, the identifiers of a gate may be loaded by an application to change the Boolean expression being evaluated.

As before, each gate G is associated with three IDs: its name G.i, the name G.t of the next gate to process the input when G is true, and the name G.f of the next gate to process the input when G is false. Let "nextIn" be the ID encoded on the lines incoming to G and "nextOut" be the ID encoded on the lines leaving from G. Then "nextOut" may be set using the following rule:

if (G.i==nextIn) if (G.V) nextOut=G.t else nextOut=G.f
   else nextOut=nextIn;

The rule may be implemented using a LM for each output line and hence evaluated in one cycle. Consequently, at each cycle, the value of E is produced for a different input vector. To achieve this, the input is staggered. For example, the different phases of the staggered input vectors will be {a0 . . . }, {a1,b0 . . . }, {a2,b1,c0 . . . }, {a3,b2,c1,d0}, {a4,b3,c2,d1}, {a5,b4,c3,d2}, . . . . After the first staggered input sets, at each clock cycle, the output of LP gate 1510d contains the consecutive values of E for the consecutive input vectors {a0,b0,c0,d0}, {a1,b1,c1,d1}, {a2,b2,c2,d2} . . . . In the embodiment of FIG. 15, it will take 4 clock cycles for the LP 1500 to produce a solution from the input of gate 1510a to the output or 1510d.

The LP may be used in this manner for evaluating the logical expression for a stream of input vectors. The advantage of the LP lies in the fact that it requires only n logical units, each one connected to the next one by $\lceil \log_2 j \rceil$, where $j=\lceil \log_2(2n/3+2) \rceil$, lines, and hence a smaller circuit area. For example, the LP 1500 with only 4 lines may accommodate all logical expressions with up to 98,301 literals. For reference, we list the upper bound n(j) on n for which j lines suffice: n(2)=21, n(3)=381, n(4)=98301, n(5)=6.44×10$^9$, n(6)=2.76×10$^{19}$.

The logic pipe is a departure from previously disclosed logical circuit architecture, because the output of one gate is not a set of truth-values, but rather an identifier or address (identifying another downstream gate) that is written onto a pipe that connects the gate with the next gate. Hence, at each clock cycle, each gate checks whether the address or identifier delivered to it by the pipe matches its own address or identifier, if so, depending on the truth-value of the logical variable or literal associated with that gate, the gate will write one or another identifier or address onto the pipe. This allows an identifier associated with a first gate to be reused as the identifier associated with a subsequent gate in the logic pipe. This reduces the number of identifiers or addresses used to determine the logical solution of an expression.

Figure 16:
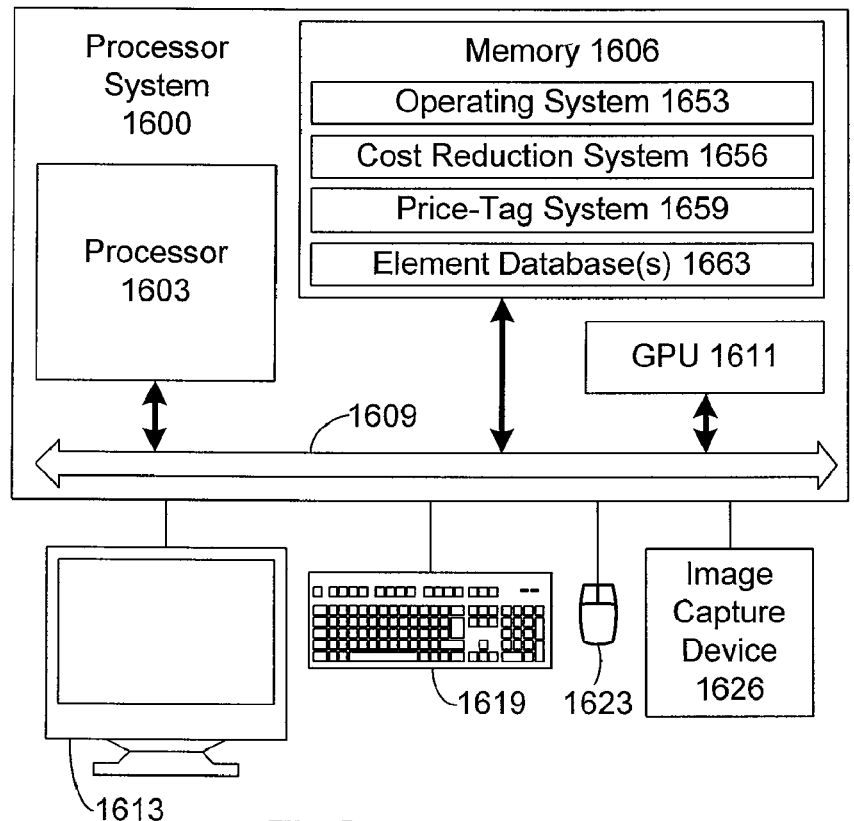
FIG. 16 is a schematic block diagram of one example of a system employed to reduce the cost of a blist circuit according to an embodiment of the present disclosure.

Referring next to FIG. 16, shown is a schematic block diagram of one example of a system employed to reduce the cost of a blist circuit according to the various embodiments as set forth above. As shown, a processor system 1600 is provided that includes a processor 1603 and a memory 1606, both of which are coupled to a local interface 1609. The processor system 1600 may also include a graphics processing unit (GPU) 1611 or other dedicated graphics rendering device, which is coupled to the local interface 1609. The local interface 1609 may be, for example, a data bus with an accompanying control/address bus as can be appreciated by those with ordinary skill in the art. The processor system 1600 may comprise, for example, a computer system such as a server, desktop computer, laptop, personal digital assistant, or other system with like capability.

Coupled to the processor system 1600 are various peripheral devices such as, for example, a display device 1613, a keyboard 1619, and a mouse 1623. In one embodiment, the GPU 1611 may be utilized to provide graphical representations for display on the display device 1613. In addition, other peripheral devices that allow for the capture of various elements may be coupled to the processor system 1600 such as, for example, an image capture device 1626, an audio capture device, or combinations thereof. The image capture device 1626 may comprise, for example, a digital camera, video camera or other such device that generates one or more images.

Stored in the memory 1606 and executed by the processor 1603 are various components that provide various functionality according to the various embodiments of the present disclosure. In the example embodiment shown, stored in the memory 1606 is an operating system 1653, a cost reduction system 1656, and a price-tag system 1659. In addition, stored in the memory 1606 are various element databases 1663. The element databases 1663 may be accessed by the other systems as needed. The element databases 1663 may comprise literals, primitive solids (e.g., blocks, cylinders, spheres . . . ), binary trees, blist circuits or other digital images as can be appreciated.

The cost reduction system 1656 is executed by the processor 1603 in order to reduce the cost of Boolean expressions as described previously. The cost reduction system 1656 may utilize binary trees, blist circuits or other elements stored in an element database 1663. The element databases 1663 may also be used to store the reduced cost positive-form Boolean expressions, binary trees, or blist circuits produced by the cost reduction system. In addition, the cost reduction system 1656 may include other functionality not discussed herein.

The price-tag system 1659 is executed by the processor 1603 in order to reduce the cost of Boolean expressions as described previously. The price-tag system 1659 may utilize binary trees, blist circuits or other elements stored in an element database 1663. The element databases 1663 may also be used to store the price-tags, binary trees, or blist circuits produced by the price-tag system. In addition, the price-tag system 1659 may include other functionality not discussed herein.

A number of software components are stored in the memory 1606 and are executable by the processor 1603. In this respect, the term "executable" means a program file that is in a form that can ultimately be run by the processor 1603. Examples of executable programs may be, for example, a compiled program that can be translated into machine code in a format that can be loaded into a random access portion of the memory 1606 and run by the processor 1603, or source code that may be expressed in proper format such as object code that is capable of being loaded into a of random access portion of the memory 1606 and executed by the processor 1603, etc. An executable program may be stored in any portion or component of the memory 1606 including, for example, random access memory, read-only memory, a hard drive, compact disk (CD), floppy disk, or other memory components.

The memory 1606 is defined herein as both volatile and nonvolatile memory and data storage components. Volatile components are those that do not retain data values upon loss of power. Nonvolatile components are those that retain data upon a loss of power. Thus, the memory 1606 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 1603 may represent multiple processors and the memory 1606 may represent multiple memories that operate in parallel. In such a case, the local interface 1609 may be an appropriate network that facilitates communication between any two of the multiple processors, between any processor and any one of the memories, or between any two of the memories etc. The processor 1603 may be of electrical, optical, or molecular construction, or of some other construction as can be appreciated by those with ordinary skill in the art.

The operating system 1653 is executed to control the allocation and usage of hardware resources such as the memory, processing time and peripheral devices in the processor system 1600. In this manner, the operating system 1653 serves as the foundation on which applications depend as is generally known by those with ordinary skill in the art.

The previous discussion relating to the illustrations and flow charts of FIGS. 6, 10A-C, 11A-C, and 13 describe various examples of functionality of the various systems as set forth above. For each illustration and flow chart, the functionality may implemented, for example, using an object oriented design. If such is the case, then each action or block may be considered as representing functionality that may be implemented in one or more methods that are encapsulated in one or more objects. The various functionality depicted in the illustrations and flow charts described herein may be implemented using any one of a number of programming languages such as, for example, C, C++, C#, JAVA, Perl, Python, Flash, or other programming languages.

Referring to FIG. 6, which was previously discussed, shown is a flow chart that can provide one example of the operation of the price-tag system 1659 to determine a price-tag for a binary tree node according to an embodiment of the present disclosure. Alternatively, the flow chart of FIG. 6 may be viewed as depicting steps of an example of a method implemented in the processor system 1600 to determine price-tags according to an embodiment of the present disclosure.

Referring to FIG. 13, which was previously discussed, shown is a flow chart that can provide one example of the operation of the cost reduction system 1656 to determine a reduced cost blist circuit according to an embodiment of the present disclosure. Alternatively, the flow chart of FIG. 13 may be viewed as depicting steps of an example of a method implemented in the processor system 1600 to reduce cost according to an embodiment of the present disclosure.

Although the reduced cost system 1656 and price-tag system 1659 are described as being embodied in software or code executed by general purpose hardware as discussed above, as an alternative the same may also be embodied in dedicated hardware or a combination of software/general purpose hardware and dedicated hardware. If embodied in dedicated hardware, each of the cost reduction system 1656 and price-tag system 1659 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The illustrations and flow charts of FIGS. 6, 10A-C, 11A-C, and 13 show the architecture, functionality, and operation of an implementation of the cost reduction system 1656 and/or the price-tag system 1659. If embodied in software, each block and action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the illustrations and flow charts of FIGS. 6, 10A-C, 11A-C, and 13 show a specific order of execution, it is understood that the order of execution may differ from that which is depicted. For example, the order of execution of two or more blocks or actions may be scrambled relative to the order shown. Also, two or more blocks or actions shown in succession in FIGS. 6, 10A-C, 11A-C, and 13 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where each of the reduced cost system 1656, and/or the price-tag system 1659 may comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the cost reduction system 1656, and/or the price-tag system 1659 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Another embodiment, among others, includes a method, comprising: determining a first modified cost measure for a node of a binary tree, the first modified cost measure comprising M cost values, the node in an original condition; pivoting the node; determining a second modified cost measure for the node in a pivoted condition, the second modified cost measure comprising M cost values; and determining a preferred node condition responsive to a comparison of the first and second cost measures. The method wherein the first and second modified cost measures each comprise three cost values. The method wherein the cost values include a maximum cost value, a minimum cost value, and an intermediate cost value. The method wherein the M cost values of the first modified cost measure are determined from M cost values of a first price-tag associated with the node in the original condition. The method wherein the M cost values of the first price-tag are determined from cost values of a second price-tag associated with a left child of the node and cost values of a third price-tag associated with a right child of the node. The method wherein the M cost values of the second modified cost measure are determined from M cost values of a fourth price-tag associated with the node in the pivoted condition. The method wherein the M cost values of the fourth price-tag are determined from cost values of a fifth price-tag associated with a left child of the node and cost values of a sixth price-tag associated with a right child of the node. The method wherein preferred node condition is the pivoted condition if the first cost measure exceeds the second cost measure. The method further comprising pivoting the node if the preferred node condition is the original condition. The method further comprising placing each node of the binary tree in a preferred node condition in a bottom-up fashion based upon a depth of the node. The method further comprising implementing a logic matrix based upon the binary tree with all nodes in the preferred node condition. The method further comprising implementing a logic pipe based upon the binary tree with all nodes in the preferred node condition.

Another embodiment, among others, includes a logic matrix, comprising: N gates, each gate associated with one of N literals of a positive-form Boolean expression, each gate configured to connect an input to either a first output or a second output responsive to a truth-value of the associated literal; and M lines, where each input and output of the N gates is connected to one of the M lines to provide a logical solution to the positive-form Boolean expression within one clock cycle. The logic matrix wherein the connections between the input and outputs of the N gates and the M lines correspond to the connections of a blist circuit modeling the positive-form Boolean expression. The logic matrix wherein the input of the N gates is connected to the true output when the truth-value of the associated literal is true. The logic matrix wherein one of the M lines is discontinuous after a connection to the input of one of the N gates. The logic matrix wherein M does not exceed $\log_2(2N/3+2)$. The logic matrix wherein the logic matrix is programmable.

Another embodiment, among others, includes a graphical processing unit, comprising a logic matrix configured to: receive a set of N truth-values, each truth-value associated with one of N literals of a positive-form Boolean expression; position N gates responsive to a corresponding one of the set of N truth-values; and provide a logical solution to the positive-form Boolean expression, responsive to the gate positions, within one clock cycle. The graphical processing unit wherein the logic matrix is further configured to: receive a second set of N truth-values, each truth-value associated with one of the N literals; position the N gates responsive to the corresponding one of the second set of N truth-values; and provide a second logical solution to the positive-form Boolean expression, responsive to the gate positions, within one clock cycle.

Another embodiment, among others, includes a logic pipe, comprising: a series of N gates connected by a pipe, each gate associated with one of N literals of a positive-form Boolean expression, a first gate of the series of N gates configured to: receive an identifier from the pipe; and if the received identifier does not match an identifier of the first gate, pass the received identifier to a next gate in the series of N gates. The logic pipe wherein the first gate is further configured to: if the received identifier matches the identifier of the gate, transmit to the next gate in the series of N gates either a first output identifier or a second output identifier responsive to a truth-value of the corresponding literal. The logic pipe wherein the identifier of a second gate in the series of N gates is the same as the identifier of the first gate. The logic pipe wherein the pipe comprises M lines. The logic pipe wherein M does not exceed $\log_2(\log_2(2N/3+2))$.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. Included in this are combinations of two or more of the energy saving embodiments described above. All such modifications and variations are intended to be included herein within the scope of this disclosure and the present disclosure and protected by the following claims. In addition, although dependent claims are delineated herein as depending from specific independent or intermediate claims, it is understood that any claim recited herein may be multiply dependent such that any claim may depend from two or more claims, or comprise a combination of any two or more claims.

Therefore, at least the following is claimed:

1. A method, comprising:
   determining, by a processor system, a first modified cost measure for a node of a binary tree, the first modified cost measure comprising at least three cost values, the node in an original condition, wherein the at least three cost values of the first modified cost measure are determined from at least three cost values of a price-tag associated with the node in the original condition;
   pivoting, by the processor system, the node;
   determining, by the processor system, a second modified cost measure for the node in a pivoted condition, the second modified cost measure comprising at least three cost values;
   determining, by the processor system, a preferred node condition responsive to a comparison of the first and second cost measures;
   placing, the processor system, each node of the binary tree in a referred node condition in a bottom-up fashion based upon a depth of the node; and
   implementing a blist circuit based upon the binary tree with all nodes in the preferred node condition.

2. The method of claim 1, wherein the at least three cost values of the price-tag associated with the node in the original condition are determined from cost values of a price-tag associated with a left child of the node in the original condition and cost values of a price-tag associated with a right child of the node in the original condition.

3. The method of claim 1, wherein the at least three cost values of the second modified cost measure are determined from at least three cost values of a price-tag associated with the node in the pivoted condition.

4. The method of claim 3, wherein the at least three cost values of the price-tag associated with the node in the pivoted condition are determined from cost values of a price-tag associated with a left child of the node in the pivoted condition and cost values of a price-tag associated with a right child of the node in the pivoted condition.

5. The method of claim 1, wherein the preferred node condition is the pivoted condition if the first modified cost measure exceeds the second modified cost measure.

6. The method of claim 1, further comprising pivoting the node if the preferred node condition is the original condition.

7. The method of claim 1, wherein the implemented blist circuit is a logic matrix.

8. The method of claim 1, wherein the implemented blist circuit is a logic pipe.

9. A method, comprising:
   determining, by a processor system, a first modified cost measure for a node of a binary tree, the first modified cost measure comprising at least three cost values, the node in the original condition;
   pivoting, by the processor system, the node;
   determining, by the processor system, a second modified cost measure for the node in a pivoted condition, the second modified cost measure comprising at least three cost values, wherein the at least three cost values of the second modified cost measure are determined from at least three cost values of a price-tag associated with the node in the pivoted condition;
   determining, by the processor system, a preferred node condition responsive to a comparison of the first and second cost measures;
   placing, by the processor system, each node of the binary tree in a preferred node condition in a bottom-up fashion based upon a depth of the node; and
   implementing a blist circuit based upon the binary tree with all in the preferred node condition.

10. The method of claim 9, wherein the at least three cost values of the price-tag associated with the node in the pivoted condition are determined from cost values of a price-tag associated with a left child of the node in the pivoted condition and cost values of a price-tag associated with a right child of the node in the pivoted condition.

11. The method of claim 9, wherein the preferred node condition is the pivoted condition if the first modified cost measure exceeds the second modified cost measure.

12. The method of claim 9, wherein the implemented blist circuit is a logic matrix.

13. The method of claim 9, wherein the implemented blist circuit is a logic pipe.

14. A system, comprising:
   at least one processor system; and
   at least one application executable in the at least one processor system, the at least one application comprising:
      logic that determines a first modified cost measure for a node of a binary tree, the first modified cost measure comprising at least three cost values, the node in an original condition, wherein the at least three cost values of the first modified cost measure are determined from at least three cost values of a price-tag associated with the node in the original condition;
      logic that pivots the node;

logic that determines a second modified cost measure for the node in a pivoted condition, the second modified cost measure comprising at least three cost values;

logic that determines a preferred node condition responsive to a comparison of the first and second cost measures;

logic that places each node of the binary tree in a preferred node condition in a bottom-up fashion based upon a depth of the node; and logic that implements a blist circuit based upon the binary tree with all nodes in the preferred node condition.

15. The system of claim 14, wherein the at least one application further comprises logic that determines the at least three cost values of the second modified cost measure from the at least three cost values of a price-tag associated with the node in the pivoted condition.

16. The system of claim 14, wherein the preferred node condition is the pivoted condition if the first modified cost measure exceeds the second modified cost measure.

17. The system of claim 14, wherein the implemented blist circuit is a logic matrix.

18. The system of claim 14, wherein the implemented blist circuit is a logic pipe.

19. A non-transitory computer-readable medium embodying a program executable in a processing system, comprising:

code that determines a first modified cost measure for a node of a binary tree, the first modified cost measure comprising at least three cost values, the node in the original condition, wherein the at least three cost values of the first modified cost measure are determined from at least three cost values of a price-tag associated with the node in the original condition;

code that pivots the node;

code that determines a second modified cost measure for the node in a pivoted condition, the second modified cost measure comprising at least three cost values, wherein the at least three cost values of the second modified cost measure are determined from at least three cost values of a price-tag associated with the node in the pivoted condition;

code that determines a preferred node condition responsive to a comparison of the first and second cost measures;

code that places each node of the binary tree in a preferred node condition in a bottom-up fashion based upon a depth of the node; and code that implements blist circuit based upon the binary tree with all nodes in the preferred node condition.

20. The non-transitory computer-readable medium of claim 19, wherein the implemented blist circuit is a logic matrix.

21. The non-transitory computer-readable medium of claim 19, wherein the implemented blist circuit is a logic pipe.

* * * * *

UNITED STATES PATENT AND TRADEMARK OFFICE
CERTIFICATE OF CORRECTION

PATENT NO.        : 8,370,115 B2                                Page 1 of 1
APPLICATION NO.   : 12/599546
DATED             : February 5, 2013
INVENTOR(S)       : Jaroslaw R. Rossignac It is certified that error appears in the above-identified patent and that said Letters Patent is hereby corrected as shown below:

On the title page item (73) Assignee:
Change "Broadcom Corporation, Irvine, CA (US)" to
--GEORGIA TECH RESEARCH CORPORATION, ATLANTA, GA (US)--.

Signed and Sealed this
Seventeenth Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO.       : 8,370,115 B2
APPLICATION NO.  : 12/599546
DATED            : February 5, 2013
INVENTOR(S)      : Jaroslaw R. Rossignac It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this
First Day of September, 2015

Michelle K. Lee
*Director of the United States Patent and Trademark Office*